United States Patent
Kim et al.

(10) Patent No.: US 8,026,003 B2
(45) Date of Patent: Sep. 27, 2011

(54) NEGATIVE ACTIVE MATERIAL FOR A NON-AQUEOUS ELECTROLYTE BATTERY, AND A NON-AQUEOUS ELECTROLYTE BATTERY COMPRISING THE SAME

(75) Inventors: Sung-Soo Kim, Seoul (KR); Kyou-Yoon Sheem, Ohsan (KR); Sang-Min Lee, Yongin (KR); Sang-Jin Kim, Suwon (KR); Joon-Sup Kim, Suwon (KR); Bok-Hwan Jung, Seoul (KR); Goo-Jin Jeong, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 1384 days.

(21) Appl. No.: 10/921,358

(22) Filed: Aug. 19, 2004

(65) Prior Publication Data
US 2005/0079417 A1 Apr. 14, 2005

(30) Foreign Application Priority Data

| Aug. 21, 2003 | (KR) | 10-2003-0057926 |
| Jan. 16, 2004 | (KR) | 10-2004-0003260 |
| Jan. 26, 2004 | (KR) | 10-2004-0004667 |
| Jan. 26, 2004 | (KR) | 10-2004-0004668 |

(51) Int. Cl.
*H01M 4/48* (2010.01)
*C01G 31/02* (2006.01)

(52) U.S. Cl. ............... 429/231.2; 429/218.1; 429/231.5; 423/594.8

(58) Field of Classification Search .................. None
See application file for complete search history.

(56) References Cited

U.S. PATENT DOCUMENTS

| 5,700,598 A | 12/1997 | Denis et al. |
| 2003/0003362 A1 | 1/2003 | Leising et al. |
| 2003/0031919 A1* | 2/2003 | Isozaki et al. .................. 429/56 |

FOREIGN PATENT DOCUMENTS

| JP | 59-20971 | 2/1984 |
| JP | 6-302320 | 10/1994 |
| JP | 7-29600 | 1/1995 |
| JP | 07-029608 A | 1/1995 |
| JP | 08-241707 | 9/1996 |
| JP | 10-188977 | 7/1998 |
| JP | 2002-216753 | 8/2002 |
| JP | 2003-68305 | 3/2003 |
| JP | 2003-142096 | 5/2003 |
| WO | WO 97/28569 | 8/1997 |

OTHER PUBLICATIONS

Machine translation of JP 07-029608, Tomiyama Hideki, Non-aqueous secondary battery, Jan. 31, 1995.*
Machine translation of JP 2003-068305, Yamamoto et al., Mar. 7, 2003.*
Yamamoto, H., et al. "Anode Properties of Li1+xV1-xO2 for Lithium Secondary Batteries," Abstract 3B05 of The 43rd Battery Symposium in Japan, pp. 332-333.

(Continued)

*Primary Examiner* — Barbara L Gilliam
*Assistant Examiner* — Kwang Han
(74) *Attorney, Agent, or Firm* — Knobbe Martens Olson & Bear LLP

(57) ABSTRACT

A negative active material of a non-aqueous electrolyte battery includes a compound represented by formula 1:

$$Li_xM_yV_zO_{2+d} \quad (1)$$

where $0.1 \leq x \leq 2.5$, $0 < y \leq 0.5$, $0.5 \leq z \leq 1.5$, $0 \leq d \leq 0.5$, and M is at least one element selected from the group consisting of Al, Cr, Mo, Ti, W, and Zr.

41 Claims, 18 Drawing Sheets

OTHER PUBLICATIONS

Sung-Soo Kim, et al. "Synthesis and Characterization of $MnV_2O_6$ as a High Capacity Anode Material for a Lithium Secondary Battery," Solid State Ionics, 139, (2001), pp. 57-65.

Adrukaitis, E., et al. "Study of $Me_x(VO_3)_2$ Vanadates, (Me = Co, Ni, Mn, 1<x<2) for Lithium Rechargeable Cells," Journal of Power Sources, 81-82 (1999) pp. 651-655.

Huang, F., et al. "A Novel $Li_2Ag_{0.5}V_2O_5$ Composite Film Cathode for All-Solid-State Lithium Batteries," Electrochemistry Communications, 5 (2003), pp. 262-266.

Search Report issued in European Patent Application No. 04090319.7 on Nov. 13, 2006.

KIPO Office Action dated Feb. 17, 2011, 4 pages.

* cited by examiner

Li
O
V

NEGATIVE ACTIVE MATERIAL FOR A NON-AQUEOUS ELECTROLYTE BATTERY, AND A NON-AQUEOUS ELECTROLYTE BATTERY COMPRISING THE SAME

CROSS-REFERENCE TO RELATED APPLICATIONS

This application is based on application Nos. 2003-57926, 2004-3260, 2004-4667 and 2004-4668 filed in the Korean Intellectual Property Office on Aug. 21, 2003, Jan. 16, 2004, Jan. 26, 2004, and Jan. 26, 2004, the disclosures of which are incorporated hereinto by reference.

BACKGROUND OF THE INVENTION

1. Field of the Invention

The present invention relates to a negative active material for a non-aqueous electrolyte battery, a method of preparing the same, and a non-aqueous electrolyte battery comprising the same, and more particularly to a negative active material of a non-aqueous battery with effective stability, a method of preparing the same, and a non-aqueous battery comprising the same.

2. Description of the Related Art

Rechargeable lithium batteries, which are attractive as power sources for portable electronics, use organic electrolyte, and exhibit twice the discharge capacity of conventional batteries with alkaline aqueous solution electrolyte as well as having a higher energy density.

Positive active materials of rechargeable lithium batteries use lithium and transition metal-included oxides having a structure being capable of intercalating lithium, such as $LiCoO_2$, $LiMn_2O_4$, and $LiNi_{1-x}Co_xO_2$ ($0<x<1$).

Negative active materials use carbonaceous materials which may intercalate and deintercalate lithium, such as graphite, e.g., artificial graphite, natural graphite, natural graphite, or hard carbon. A lower discharge voltage to lithium, i.e., −0.2 V of graphite, renders a higher discharge voltage of 3.6 V which provides advantages in energy density, and good reversibility guarantees long cycle life. Owing to these advantages, graphite is widely used as the negative active material. However, graphite has a low density per unit volume of the electrode (nominal density of 2.2 g/cc), which decreases capacity, and graphite easily and undesirably reacts with organic electrolytes at high discharge voltages, causing fires or explosion.

These shortcomings are addressed by developing oxide active materials. Amorphous tin oxides studied by FUJI FILM CO. exhibit a high capacity of 800 mAh/g, but initial irreversible capacity reached approximately 50%. In addition, the discharge voltage of 0.5 V or more and an inherently smooth voltage profile cause difficulty in the use of such materials as negative active materials. In addition, a significant amount of reduction from tin oxide to tin metal occurs, which negates the use of such materials as negative active materials.

Various oxide negative active materials have been taught, e.g., in Japanese Patent Laid-Open No. 2002-216753 (SUMITOMO METAL IND., LTD.) ($Li_aMg_bVO_c$ ($0.05 \leq a \leq 3$, $0.12 \leq b \leq 2$, $2 \leq 2c-a-2b \leq 5$)), and in Abstract #3B05 of The 43rd Battery Symposium in Japan.

However, studies on oxides used as negative active materials exhibiting satisfactory battery performances are still required.

SUMMARY OF THE INVENTION

It is an aspect of the present invention to provide a negative active material of a non-aqueous battery that fails to have a side reaction with an organic electrolyte and that exhibits good safety characteristics.

It is another aspect to provide a negative active material of a non-aqueous battery having high energy density per unit volume and exhibiting a high capacity.

It is still another aspect to provide a method of preparing the negative active material of a non-aqueous electrolyte battery.

It is still another aspect to provide a non-aqueous electrolyte battery including the negative active material.

These and/or other aspects may be achieved by a negative active material of a non-aqueous battery, represented by formula 1:

$$Li_xM_yV_zO_{2+d} \qquad (1)$$

where $0.1 \leq x \leq 2.5$, $0 < y \leq 0.5$, $0.5 \leq z \leq 1.5$, $0 \leq d \leq 0.5$; and M is at least one element selected from the group consisting of Al, Cr, Mo, Ti, W and Zr.

The negative active material preferably has a tapping density of 1 to 5 g/cc, or a void volume ranging from $1 \times 10^{-3}$ cc/g to 0.8 cc/g per weight of a particle of the negative active material with a size of 0.1 to 10 μm. Alternatively, the negative active material has a full width at half-maximum of an X-ray diffraction peak at a (003) plane of 0.5 or less, and a full width at half-maximum of an X-ray diffraction peak at a (104) plane of 0.5 or less.

To achieve these and/or other aspects, the present invention provides a method of preparing the negative active material of a non-aqueous electrolyte battery. In this method, vanadium sources, lithium sources and metal sources are mixed, and the mixture is heat-treated at a temperature between approximately 500° C. and 1400° C. under a reductive atmosphere.

The present invention further includes a non-aqueous battery including a positive electrode, a negative electrode, and a non-aqueous electrolyte. The positive electrode includes a positive active material which may intercalate and deintercalate lithium ions, and the negative electrode includes the negative active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
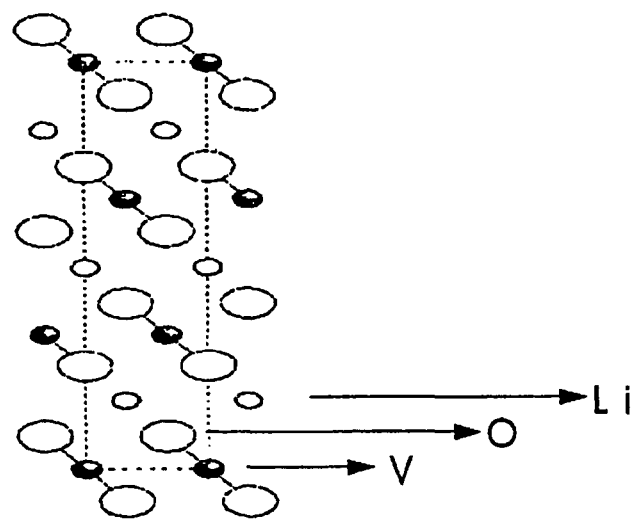
FIG. 1A is a drawing illustrating a $LiVO_2$ structure.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention relates to a negative active material of a non-aqueous electrolyte battery. The negative active material exhibits a higher density than the conventional graphite active material, increasing its energy density per unit volume. In addition, the negative active material has low reactivity with organic electrolytes and provides effective safety. The negative active material of the present invention is represented by formula 1, and has a layer structure:

$$Li_xM_yV_zO_{2+d} \quad (1)$$

where $0.1 \leq x \leq 2.5$, $0 < y \leq 0.5$, $0.5 \leq z \leq 1.5$, $0 \leq d \leq 0.5$; and M is at least one element selected from the group consisting of Al, Cr, Mo, Ti, W, and Zr, and is preferably Mo or W.

The present invention synthesizes the negative active material by substituting Co with one metal, V, and another metal, Mo, W, Ti, Cr, or Zr in $LiCoO_2$, which exhibits a discharge voltage substantially corresponding to graphite. The negative active material represented by formula 1 may provide a capacity per unit volume of 1000 mAh/cc or more.

$LiCoO_2$ or $LiNiO_2$ of an R-3M structure has an interlayer structure comprising oxygen, lithium, and a transition metal, and the lithium layer is partially intercalated or deintercalated such that they are used as rocking chair type active materials. The R-3M structure indicates layer structures which include one layer alternated with lithium and oxygen, and another layer alternated with a transition metal and oxygen.

For example, a structure of $LiVO_2$ is shown in FIG. 1A. If at least one mole of lithium is intercalated into the $LiVO_2$ structure shown in FIG. 1A, the structure is reversibly changed into the structure shown in FIG. 1B (this particular change in structure occurs in $LiNiO_2$). Such a change in structure (reversible intercalation and deintercalation of lithium shown in FIGS. 1A and 1B) appears in a Li-rich compound by partially substituting a transition metal (V) with Li and with various transition metals such as Ti, Mo, Cr, or Al.

That is, V metal ions (substituted with Li and another metal) and Li ions are presented between oxygen ions which are presented in a hexagonal, closed packing form. In particular, V metal ions (substituted with Li and another metal) are presented at an octahedral site of oxygen ions in one layer, and Li ions are present at an octahedral site in the lower layer. When lithium is intercalated into the structure to convert $Li_2NiO_2$, a V metal ion layer (substituted Li with another metal) and an oxygen ion layer are present in turn. In addition, the oxygen layer and V metal ion layer (substituted with Li and another metal) are presented in turn between the two lithium layers.

Figure 1B:
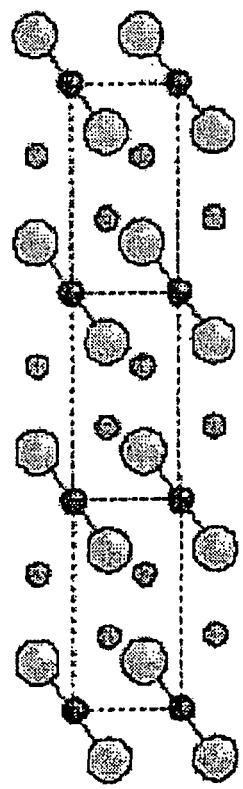
FIG. 1B is a drawing illustrating a change in a $LiVO_2$ structure if at least 1 mole of lithium is intercalated into the $LiVO_2$.

The present invention increases the lattice constant, i.e., the distance between the axes, by partially substituting V with another metal and Li so that intercalation and deintercalation of lithium smoothly occurs at low voltages. Accordingly, as shown in FIG. 1B, the width of the lithium layer facilitates smooth and active intercalation and deintercalation of lithium. Such smooth intercalation and deintercalation of lithium indicates an increase in lithium diffusion, thus improving cycle life and high-rate characteristics.

The present inventors studied changes in lattice structure to prepare the inventive active material represented by formula 1 in which intercalation and deintercalation of lithium smoothly and actively occurs at low voltages. The compound represented by formula 1 has an average oxidation state of vanadium of +1 to +4, and preferably +1 to +3. That is, the redox reaction occurs at +1 to +4, which indicates a redox voltage to lithium metal of 1 V or less. Thus, the redox reaction of the compound occurs at lower voltages than in the general vanadium oxide, which has a redox voltage to lithium metal of 2 V or more, and in which the redox reaction occurs at +3 to +4, or +4 to +5. Accordingly, it is expected that the negative active material represented by formula 1 has a high discharge voltage.

In formula 1, if x, y, z and d are outside these ranges, if the structure is modified, the redox reaction occurs at +3 to +4, or +4 to +5, which indicates a 1.0 V or of higher average potential to the lithium metal, thus decreasing the discharge voltage. Use of a compound with a value of x of less than 0.1 is taught Solid State Ionics, 139, 57-65, 2001 and Journal of Power Source, 81-82, 651-655, 1999. The compound is a vanadium negative active material without Li. The active material has a different crystalline structure from the inventive active material and has an average discharge potential of 1 V or more, which disqualifies it for use for a negative electrode.

Use of a compound with x, y, z, and d out of these ranges is taught in Electrochem. Communications 5 (2003), 261-266. The compound of $Li_2Ag_{0.5}V_2O_5$ also has a different crystalline structure from the inventive active material, and has a potential of 3 to 1 V, which is a voltage corresponding to a positive electrode rather than a negative electrode.

The negative active material of the present invention has a distance ratio between axes (axial ratio of c/a) of 2.5 to 6.5, and preferably 3.0 to 6.2, before lithium intercalation. If the distance ratio is outside this range, it is difficult to intercalate and deintercalate lithium and the voltage in which intercalation and deintercalation occur increases by 0.6 V or more. Furthermore, a hysteresis phenomenon occurs in which a difference between the voltage of intercalation and the voltage of deintercalation is due to the participation of oxygen in the reaction.

The negative active material of the present invention has a distance ratio between axes of 3.5 to 7.0, and preferably 4.0 to 7.0 after lithium intercalation.

The negative active material of the present invention has a change in volume of the crystal lattice of 30% or less, and preferably 27% to 0%, according to lithium intercalation and deintercalation. If the change in volume is more than 30%, cracking occurs, causing a short-cut, separation of the active material from the current collector, and agglomeration, so that the internal resistance increases, the capacity decreases and the cycle life deteriorates.

Generally, the charging of the battery is performed by constant-current and constant-voltage charging, obtaining capacity. Unfortunately, a metal or a composite of a metal and graphite active material which has recently been studied as a higher capacity active material are unable to constant-voltage charge because intercalation and deintercalation mechanisms in metal are different from such mechanisms in graphite. If the constant-voltage charge is applied to the metal or the composite, the structure of the active material is broken, causing severe deterioration, or the extraction of lithium occurs, causing problems associated with reversibility and safety. These shortcomings make it difficult to use the metal or the composite active material in a battery, even though they have high capacity.

However, the negative active material of the present invention may be constant current/constant voltage charged so that it is useful for a battery.

The negative active material of the present invention has a nominal energy density per unit volume of 4.2 g/cc and an experimental energy density of about 3.0 g/cc. Furthermore, it has a nominal capacity per unit volume of 1200 mAh or more, and a theoretical capacity of 900 mAh/cc. On the other hand, the conventional graphite active material has a nominal energy density per unit volume of 2.0 g/cc, an energy density of substantially 1.6 g/cc, and a capacity by volume of substantially 570 mAh/cc. Thus, the negative active material of the present invention has an energy density that is twice the energy density of the conventional graphite active material.

A negative electrode using the negative active material of the present invention preferably has a density of 1 to 5 g/cc and more preferably 1.2 to 4.5 g/cc. Increased density renders loading of a large amount of active material so that it can provide a high-capacity battery, but too high a density obtained from severe pressure causes an extreme reduction in voids of the electrode which results in decreased electrolyte immersion, thereby deteriorating high-rate characteristics. Therefore, more than 5 g/cc of density deteriorates the high-rate characteristics and less than 1 g/cc of density decreases capacity.

The negative active material of the present invention preferably has a tapping density of 1 to 5 g/cc, and more preferably 1.2 to 4.5 g/cc. When the tapping density is out of these ranges, it is difficult to form a high-density electrode.

The negative active material of the present invention preferably has an average diameter of 1 to 100 μm, and more preferably 5 to 80 μm. An average diameter of less than 1 μm causes a side-reaction between the negative active material and the electrolyte, and more than 100 μm decreases packing density in electrode preparation.

The negative active material of the present invention preferably has a void volume of $1 \times 10^{-3}$ to 0.5 cc/g per weight of the particle having a size of 0.1 to 10 μm, more preferably 0.01 to 0.5 cc/g, and most preferably 0.1 to 0.3 cc/g. The void volume is measured by the mercury injection process. If the void volume is less than $1 \times 10^{-3}$ cc/g, the high-rate characteristics deteriorate, if the void volume is more than 0.5 cc/g, the capacity per weight decreases.

The negative active material of the present invention preferably has a specific surface area (BET) of 0.01 to 10 $m^2/g$, and more preferably 0.01 to 5 $m^2/g$. The specific surface area is determined from the nitrogen absorption BET process. If the specific surface area is less than 0.01 $m^2/g$, the high-rate characteristics deteriorate. If the specific surface area is more than 10 $m^2/g$, the side-reaction between the electrolyte and the negative active material occurs.

The negative active material of the present invention has a full width at half-maximum of an X-ray diffraction peak at (003) plane of 0.5 or less, and more preferably 0.3 or less, and that at (103) plane of 0.5 or less, and more preferably 0.4 or less. If the full width at half-maximum is more than 0.5, the structure is unstable, decreasing initial capacity and causing fading enlarged capacity loss as the cycles repeat.

The negative active material of the present invention has an X-ray diffraction intensity ratio of the (003) plane to (104) plane (l(003)/l(104)) of between 0.3 to 2, and more preferably 0.5 to 1.5.

The negative active material of the present invention has of 2.8 Å<lattice constant of a axis<2.9 Å, and 14 Å<lattice constant of c axis<15 Å. When the lattice constant is out of these ranges, the layer structure is distorted so that the capacity decreases.

The negative active material of the present invention is used in a negative electrode for a rechargeable lithium battery including a positive electrode and an electrolyte. The negative electrode employs only the inventive negative active material, or a mixture of the inventive negative active material and a carbonaceous negative active material at a weight ratio of 1 to 99:99 to 1, and preferably 10 to 90:90 to 10.

The negative active material of the present invention has lower reactivity with organic electrolytes, and thus has effective stability compared to the conventional carbonaceous material.

Preparation of a Negative Active Material of the Present Invention Will be Illustrated More specifically below.

A vanadium source, a lithium source, and a metal source are mixed without a solvent. The mixing ratio therebetween may be suitably controlled if a desired product is a compound represented by formula 1. The vanadium source may be VO, $V_2O_3$, $V_2O_4$, $V_2O_5$, $V_4O_7$, $VOSO_4 \cdot nH_2O$, or $NH_4VO_3$, and the lithium source may be lithium carbonate, lithium hydroxide, lithium nitrate, or lithium acetate. The metal source may be oxides or hydroxides that include Al, Cr, Mo, Ti, W, and Zr, and examples thereof are $Al(OH)_3$, $Al_2O_3$, $Cr_2O_3$, $MoO_3$, $TiO_2$, $WO_3$, and $ZrO_2$.

The mixture is heat-treated at approximately 500° C. to 1400° C., and preferably at 900 to 1200° C., under a reductive atmosphere to prepare the inventive negative active material represented by formula 1. If the heat-treatment temperature is outside such a range, impurities (e.g., $Li_3VO_4$) may be formed, resulting in a decrease in capacity and in a deterioration of the cycle life characteristic.

The reductive atmosphere is a nitrogen atmosphere, an argon atmosphere, a $N_2/H_2$ gas mixture atmosphere, a $CO/CO_2$ gas mixture atmosphere, or a helium atmosphere. The oxygen partial pressure of the reductive atmosphere is preferably less than $2 \times 10^{-1}$ atmospheres. A higher oxygen partial pressure than $2 \times 10^{-1}$ atmospheres produces an oxidative atmosphere which oxidizes metal oxide to prepare an undesired oxygen-rich product, or prepares a mixture of a desired product and an undesired product.

A positive electrode of a non-aqueous electrolyte battery, including the negative electrode with the negative active material, includes a positive active material which may intercalate and deintercalate lithium. Exemplary thereof are at least one selected from compounds represented by formulas 2 to 13:

$$Li_xMn_{1-y}M_yA_2 \quad (2)$$
$$Li_xMn_{1-y}M_yO_{2-z}X_z \quad (3)$$
$$Li_xMn_2O_{4-z}X_z \quad (4)$$
$$Li_xCo_{1-y}M_yA_2 \quad (5)$$
$$Li_xCo_{1-y}M_yO_{2-z}X_z \quad (6)$$
$$Li_xNi_{1-y}M_yA_2 \quad (7)$$
$$Li_xNi_{1-y}M_yO_{2-z}X_z \quad (8)$$
$$Li_xNi_{1-y}Co_yO_{2-z}X_z \quad (9)$$
$$Li_xNi_{1-y-z}Co_yM_zA_a \quad (10)$$
$$Li_xNi_{1-y-z}Co_yM_zO_{2-a}X_a \quad (11)$$
$$Li_xNi_{1-y-z}Mn_yM_zA_a \quad (12)$$
$$Li_xNi_{1-y-z}Mn_yM_zO_{2-a}X_a \quad (13)$$

wherein, $0.90 \leq x \leq 1.1$; $0 \leq y \leq 0.5$; $0 \leq z \leq 0.5$; $0 \leq \alpha \leq 2$;
M is at least one element selected from the group consisting of Al, Ni, Co, Mn, Cr, Fe, Mg, Sr, V, and rare earth elements;
A is selected from the group consisting of O, F, S, and P; and
X is selected from F, S, and P.

The negative electrode and the positive electrode are produced by respectively mixing an active material, a conductive agent, and a binder in a solvent to prepare an active material composition and coating the composition on a current collector. The electrode preparation is well known in the related art; thus, the detailed description of electrode preparation will not be taught in the application.

The conductive agent includes any conventional conductive agent used for an active material composition as long as the conductive agent is chemically inert and has electrical conductivity. Examples thereof are one or a mixture selected from natural graphite; artificial graphite; carbon black; acetylene black; ketjen black; carbon fiber; a metal fiber such as copper, nickel, aluminum, and silver; and polyphenylene derivatives (Japanese Patent Laid-Open No. Sho 59-20971).

The binder may be polyvinyl alcohol, carboxymethylcellulose, hydroxylpropylenecellulose, diacetylenecellulose, polyvinylchloride, polyvinylpyrrolidone, polytetrafluoroethylene, polyvinylidene fluoride, polyethylene, or polypropylene.

The solvent may be N-methylpyrrolidone.

A non-aqueous electrolyte includes an organic solvent and a lithium salt. The organic solvent includes at least one carbonate, ester, ether or ketone. If a mixed solvent is used, the mixing ratio may be suitably controlled according to desired battery characteristics, as may be understood by one skilled in the related art. The carbonate may be, but is not limited to, at least one dimethyl carbonate, diethyl carbonate, dipropyl carbonate, methylpropyl carbonate, ethylpropyl carbonate, methylethyl carbonate, ethylene carbonate, propylene carbonate, butylenes or carbonate. The ester may be, but is not limited to, γ-butyrolactone, decanolide, valerolactone, mevalonolactone, caprolactone, n-methyl acetate, n-ethyl acetate, or n-propyl acetate. The ether may be, but is not limited to, dibutyl ether. The ketone may be, but is not limited to, polymethylvinyl ketone.

Alternatively, the non-aqueous organic solvent may further include aromatic organic solvents. Examples of the aromatic organic solvents are benzene, fluorobenzene, toluene, fluorotoluene, trifluorotoluene, and xylene.

The lithium salts may be at least one selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)$ (where x and y are natural numbers), LiCl, and LiI. The lithium salts are dissolved in an organic solvent to act as a lithium-ion supporting source, which helps to allow the operation of the battery and facilitate the transfer of lithium ions. The concentration of the lithium salt is generally approximately 0.1 to 2.0 M in the electrolyte.

Figure 2:
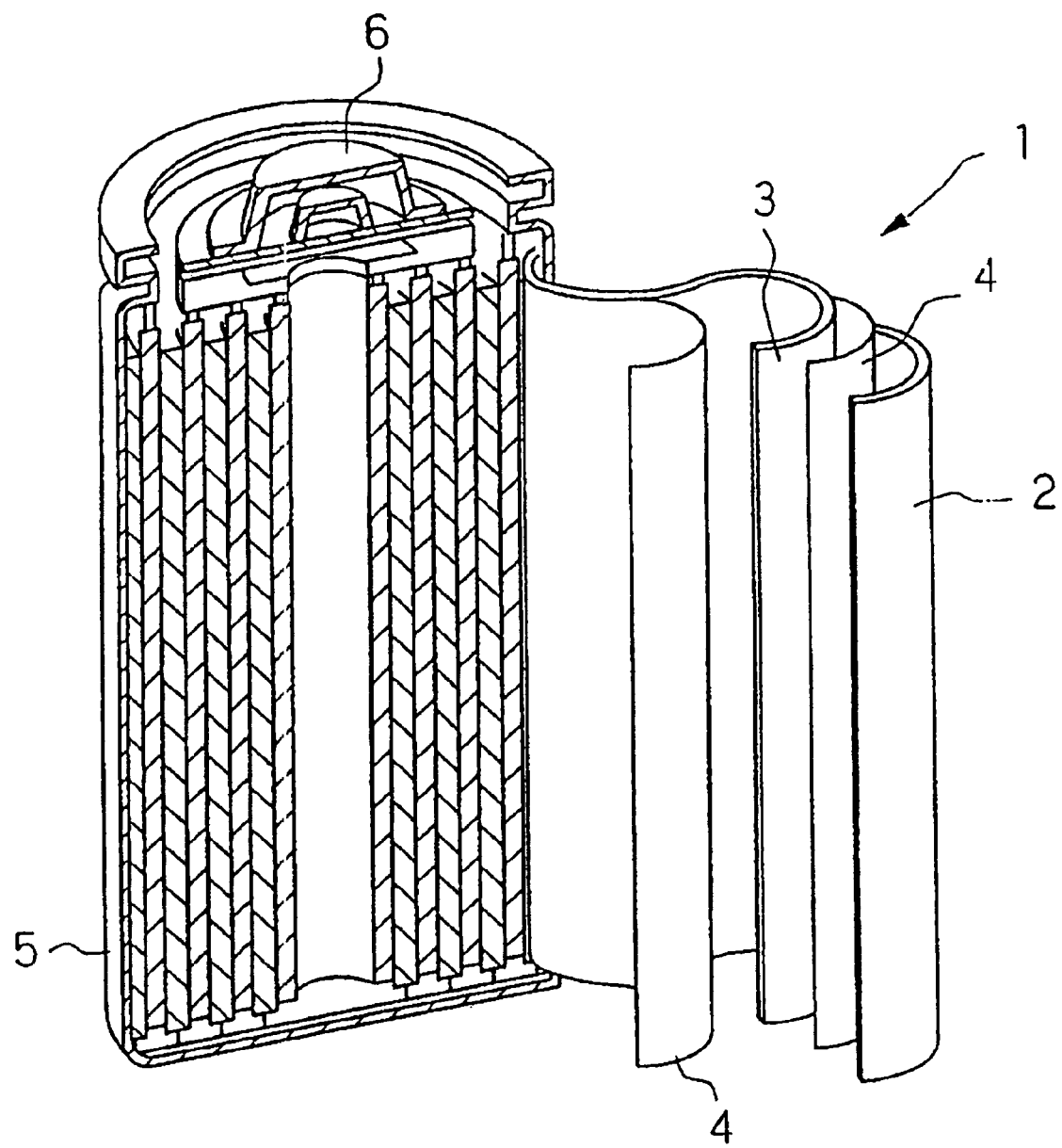
FIG. 2 is a schematic diagram showing an embodiment of a non-aqueous electrolyte battery of the present invention.

An embodiment of a non-aqueous electrolyte battery of the present invention is illustrated in FIG. 2. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic, or pouch type battery as is well understood in the related art.

The following examples illustrate the present invention in further detail, but it is understood that the present invention is not limited by these examples.

Example 1

$Li_2CO_3$, $V_2O_4$ and $MoO_3$ were mixed at the mole ratio of Li:V:Mo of 1.1:0.89:0.01 without solvent. The mixture was heat-treated at 1100° C. under a nitrogen atmosphere to provide a $Li_{1.1}V_{0.89}Mo_{0.01}O_2$ negative active material. The negative active material had a diffraction pattern of a single phase of an R-3M crystal structure.

80 wt % of the negative active material, 10 wt % of a graphite conductive agent and 10 wt % of a polytetrafluoroethylene binder were mixed in an N-methylpyrrolidone solvent to prepare a negative active material slurry. The slurry was coated on a Cu-foil current collector to produce a negative electrode. The density of the active mass (a mixture of the active material, the conductive agent and the binder) was 1.6 g/cc.

The charge and discharge characteristics of the negative active material exhibited a high initial reversible capacity of 800 mAh/cc and better cycle life characteristics than the conventional graphite active material.

Example 2

A negative electrode was produced by the same procedure as in Example 1, except that the mole ratio of Li:V:Mo was changed to 1.1:0.87:0.03 to prepare a $Li_{1.1}V_{0.97}Mo_{0.03}O_2$ negative active material.

Example 3

A negative electrode was produced by the same procedure as in Example 1, except that the mole ratio of Li:V:Mo was changed to 1.1:0.85:0.05 to prepare a $Li_{1.1}V_{0.85}Mo_{0.05}O_2$ negative active material.

Comparative Example 1

A negative electrode was produced by the same procedure as in Example 1, except that $Li_2CO_3$ and $V_2O_4$ were mixed at the mole ratio of Li:V of 1.1:0.9 without solvent to prepare a $Li_{1.1}V_{0.9}O_2$ negative active material.

Comparative Example 2

$Li_2CO_3$ and $V_2O_4$ were mixed at the mole ratio of Li:V of 1.1:0.9 without solvent, and the mixture was heat-treated at 1200° C. under a nitrogen atmosphere to prepare a $Li_{1.1}V_{0.9}O_2$ negative active material. Using the negative active material, a negative electrode was produced by the same procedure as in Comparative Example 1.

Comparative Example 3

$Li_2CO_3$ and $V_2O_4$ were mixed at the mole ratio of Li:V of 1.1:0.9 without solvent, and the mixture was heat-treated at 1100° C. under a nitrogen atmosphere to prepare a $Li_{1.1}V_{0.9}O_2$ negative active material. Using the negative active material, a negative electrode was produced by the same procedure as in Comparative Example 1.

Charge and Discharge Characteristics

Figure 3:
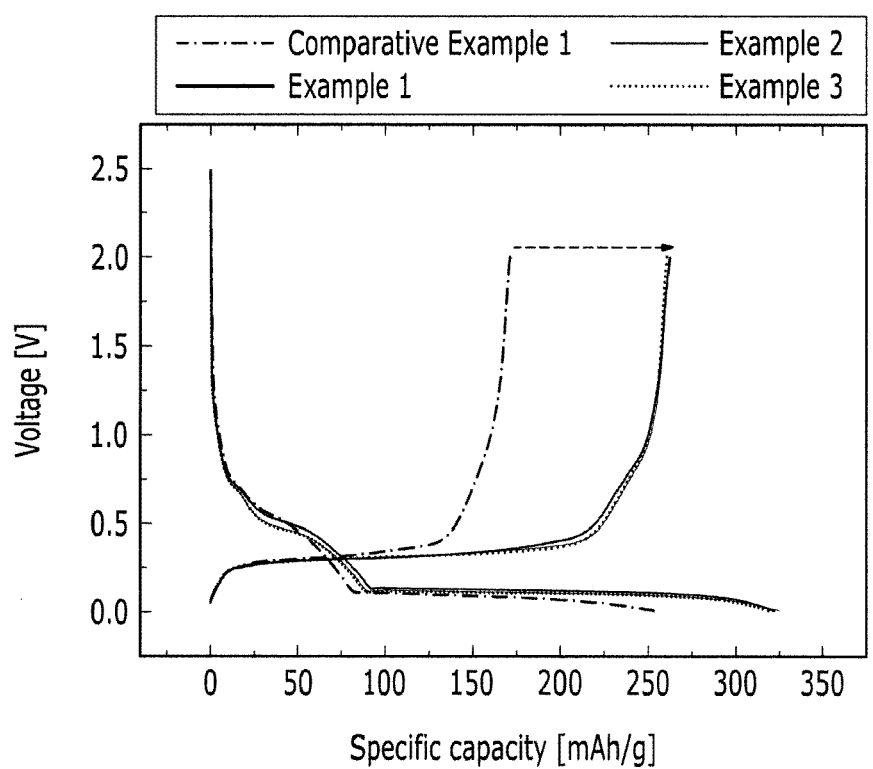
FIG. 3 is a graph showing charge and discharge characteristics of the cells according to Examples 1 to 3 of the present invention and Comparative Example 1.

Using the negative electrodes according to Examples 1 to 3 and Comparative Example 1, and lithium metal counter electrodes, half-cells were fabricated by the general procedure. The cells were constant-charged at a 0.2 C rate from 0 to 2 V. The charge and discharge characteristics are shown in FIG. 3. As shown in FIG. 3, the negative active material according to Examples 1 to 3 wherein Mo is substituted for predetermined amounts of vanadium exhibited higher capacity than the negative active material without Mo according to Comparative Example 1.

Example 4

A negative electrode was produced by the same procedure as in Example 1, except that $Li_2CO_3$, $V_2O_3$ and $TiO_2$ were mixed at the mole ratio of Li:V:Ti of 1.1:0.89:0.01 to prepare a $Li_{1.1}V_{0.89}Ti_{0.01}O_2$ negative active material.

Example 5

A negative electrode was produced by the same procedure as in Example 4, except that the mole ratio of Li:V:Ti was changed to 1.1:0.87:0.03 to prepare a $Li_{1.1}V_{0.87}Ti_{0.03}O_2$ negative active material.

Example 6

A negative electrode was produced by the same procedure as in Example 4, except that the mole ratio of Li:V:Ti was changed to 1.1:0.85:0.05 to prepare a $Li_{1.1}V_{0.85}Ti_{0.05}O_2$ negative active material.

Charge and Discharge Characteristics

Figure 4:
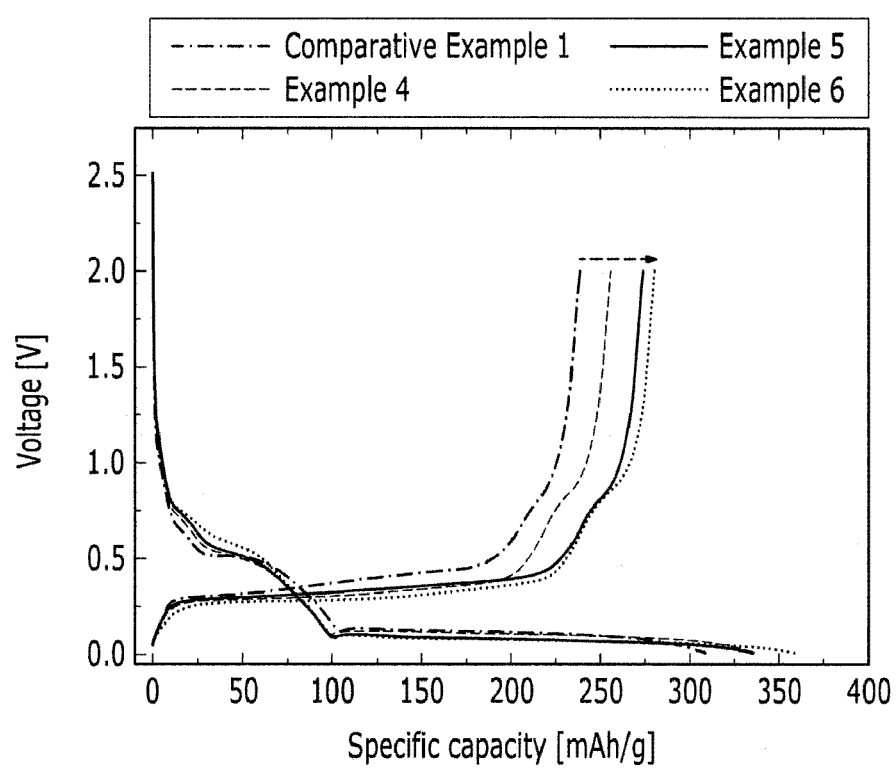
FIG. 4 is a graph showing charge and discharge characteristics of the cells according to Examples 4 to 6 of the present invention and Comparative Example 1.

Using the negative electrodes according to Examples 4 to 6 and lithium metal counter electrodes, half-cells were fabricated by the general procedure. The cells were constant-charged at a 0.2 C rate between 0 to 2 V, and the charge and discharge characteristics are shown in FIG. 4. FIG. 4 indicates that the negative active material according to Examples 4 to 6, made by substituting Ti for predetermined amounts of vanadium, exhibited a higher capacity than the negative active material without Ti according to Comparative Example 1.

Example 7

A negative electrode was produced by the same procedure as in Example 4, except that the density of the active mass was changed to 2.4 g/cc.

Charge and Discharge Characteristics

Figure 5:
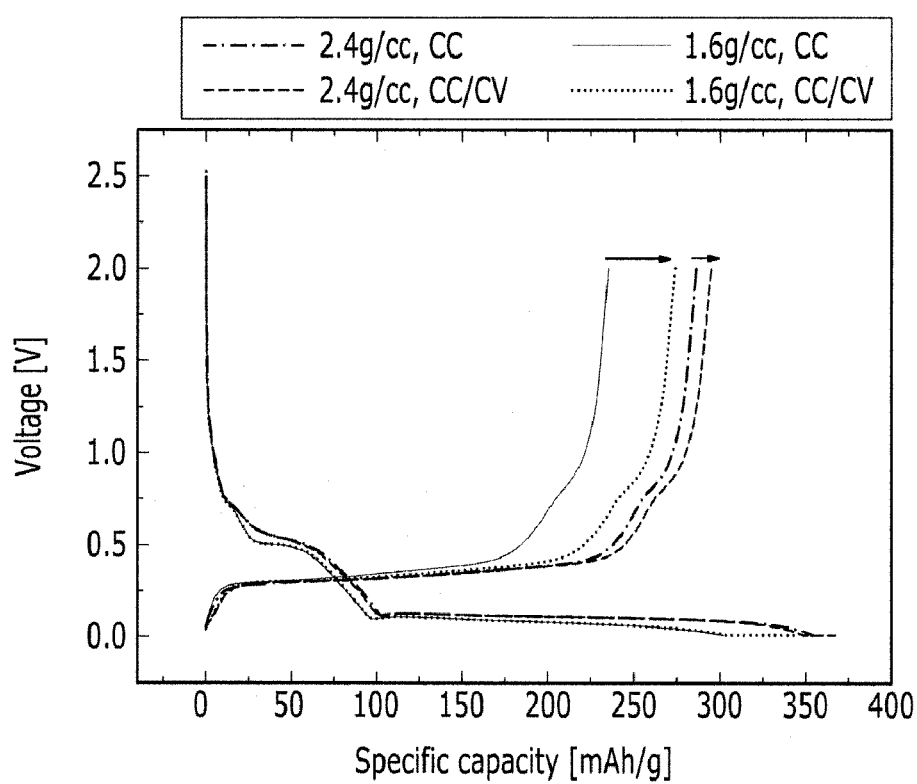
FIG. 5 is a graph showing constant current charge and discharge characteristics and constant voltage charge and discharge characteristics of the cells according to Examples 4 and 7 of the present invention.

Using the negative electrode according to Example 7 and a lithium metal counter electrode, a half-cell was fabricated by the general procedure. Cells according to Examples 7 and 4 were constant-current charged at a 0.2 C rate between 0 to 2 V, and the cells were 0.01 V constant-voltage charged at a 1/50 C rate. The charge and discharge characteristics are shown in FIG. 5. It is evident from FIG. 5 that the cells according to Examples 4 and 7 may both be constant-current charged and constant-voltage charged even though the negative electrode of Example 7 had an increased active mass density compared to the negative electrode of Example 4.

Example 8

A negative electrode was produced by the same procedure as in Example 4 except that the $Li_{1.1}V_{0.89}Ti_{0.01}O_2$ negative active material was mixed with a graphite conductive agent in the weight ratio of 5:5, and 90 wt % of the mixture was mixed with 10 w % of a binder.

Example 9

A negative electrode was produced by the same procedure as in Example 8 except that the density of the active mass was changed to 2.4 g/cc.

Cycle Life Characteristics

Figure 6:
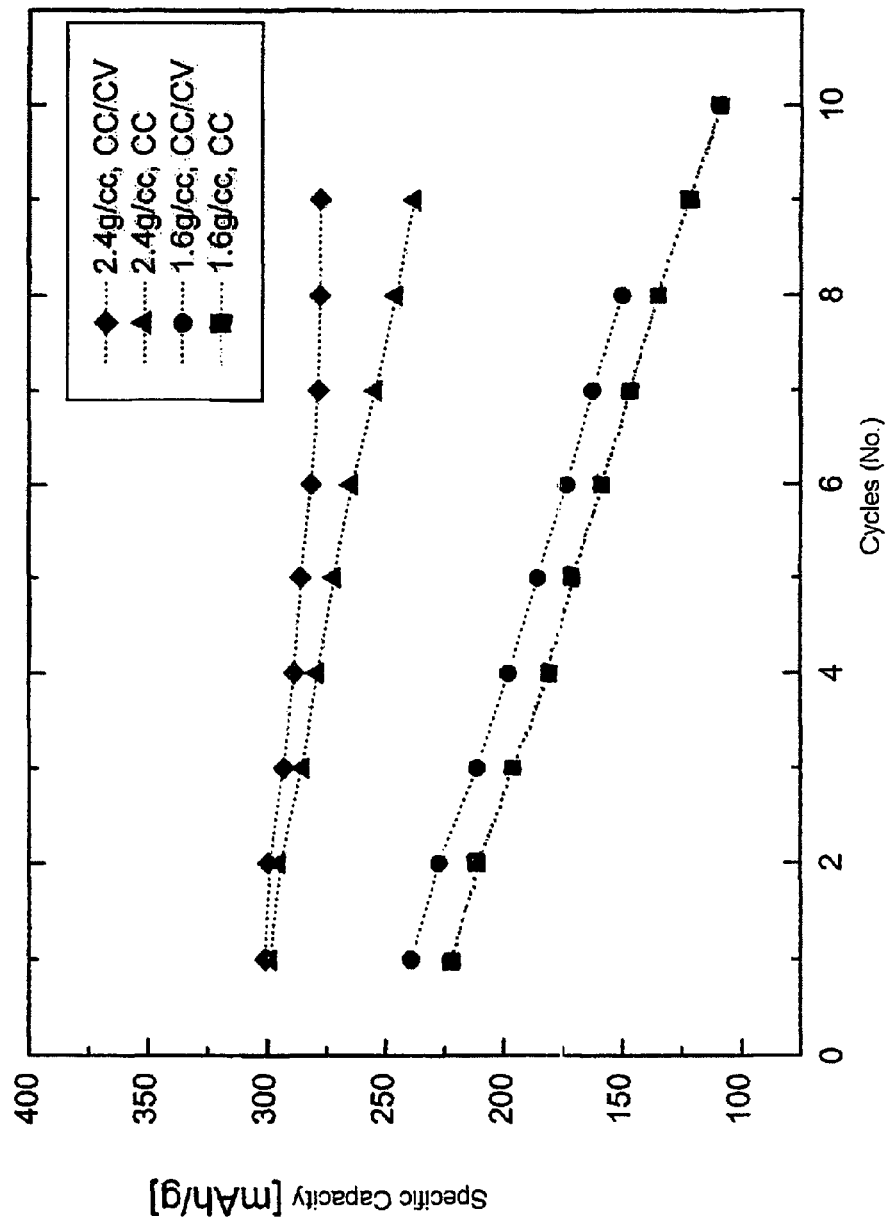
FIG. 6 is a graph showing constant current charge and discharge characteristics and constant voltage charge and discharge characteristics of the cells according to Examples 8 and 9 of the present invention.

Using the negative electrodes according to Examples 8 and 9 and lithium metal counter electrodes, half-cells were fabricated by the general procedure. The half-cells were constant-current charged at 0.2 C between 0 to 2 V, and the cells were constant-current and 0.01 constant-voltage charged at a 1/50 C rate. The cycle life characteristics are presented in FIG. 6. FIG. 6 indicates that the cells according to Examples 8 and 9 may both be constant-current and constant-voltage charged even though the density of the active mass of Example 9 increased compared to the density of the active mass of Example 8.

Charge and Discharge Characteristics at Various Rates

Figure 7:
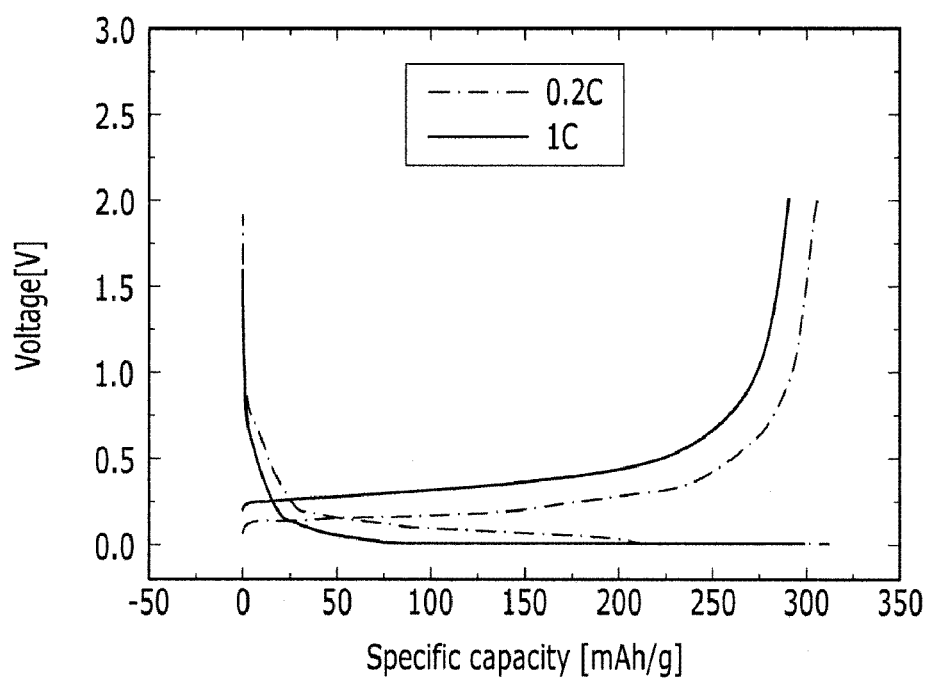
FIG. 7 is a graph illustrating rate characteristics after the cell according to Example 8 of the present invention is constant voltage and constant current charged at a 0.2 C rate and a 1 C rate.

The cell according to Example 8 was constant-current and constant-voltage charged at a 0.2 C rate and a 1 C rate for 5 cycles, respectively. The results as shown in FIG. 7 demonstrate that the capacity at 0.2 C corresponded to 95.5% of the capacity at 1 C, indicating virtually no deterioration at high rates. The conventional graphite negative active material has a capacity at 0.2 C that corresponds to 80 to 95% of the capacity at 1 C.

Determination of Oxidation Number

Figure 8:
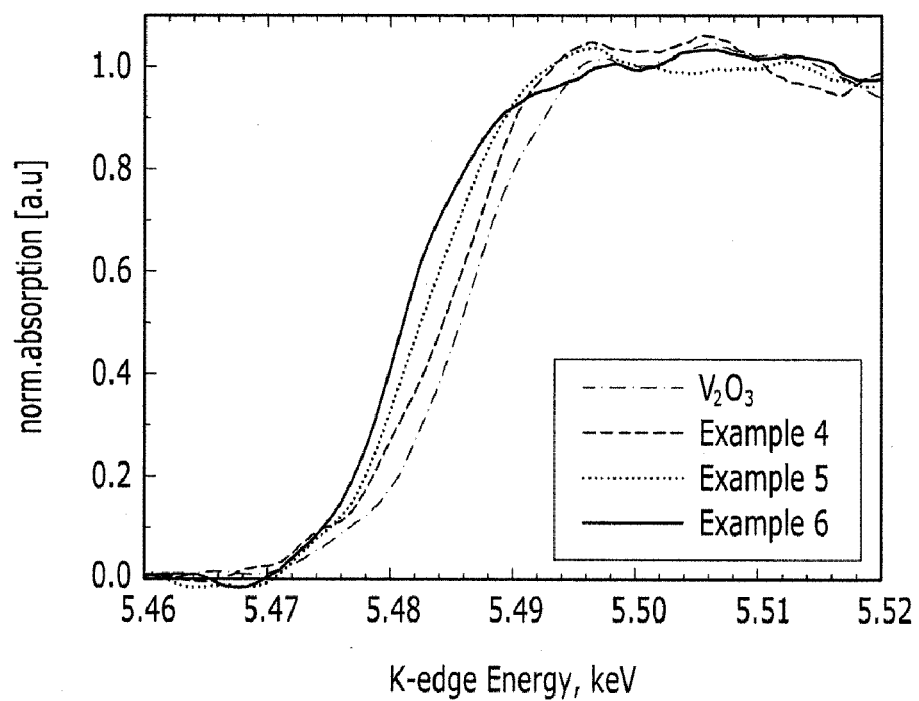
FIG. 8 is a graph illustrating K-edge energies of the negative active materials according to Examples 4 and 6.
Figure 9:
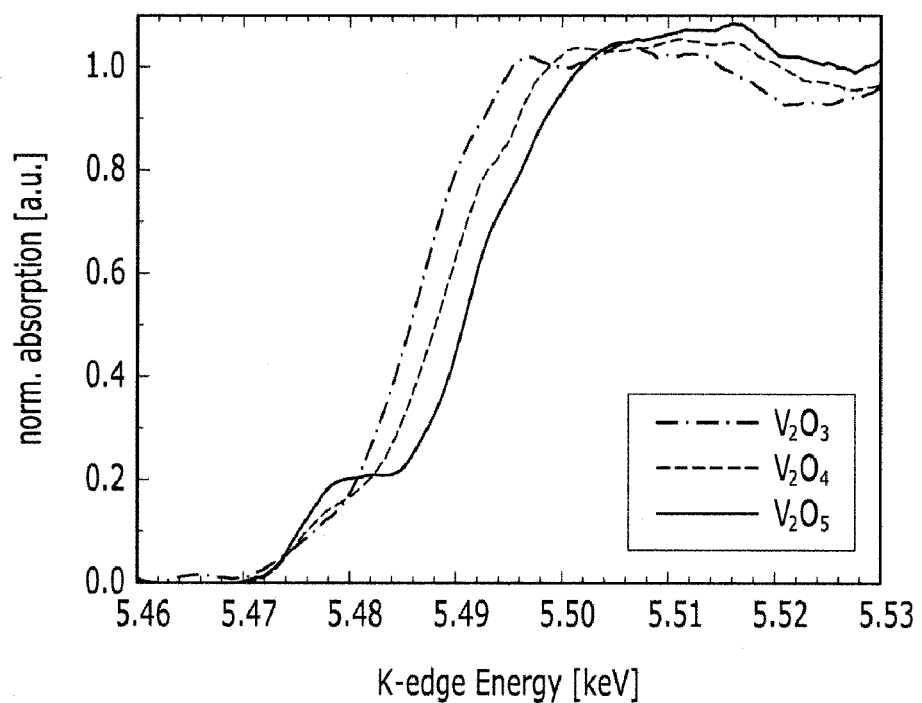
FIG. 9 is a graph illustrating K-edge energies of $V_2O_3$, $V_2O_4$, and $V_2O_6$ vanadium oxides.
Figure 10:
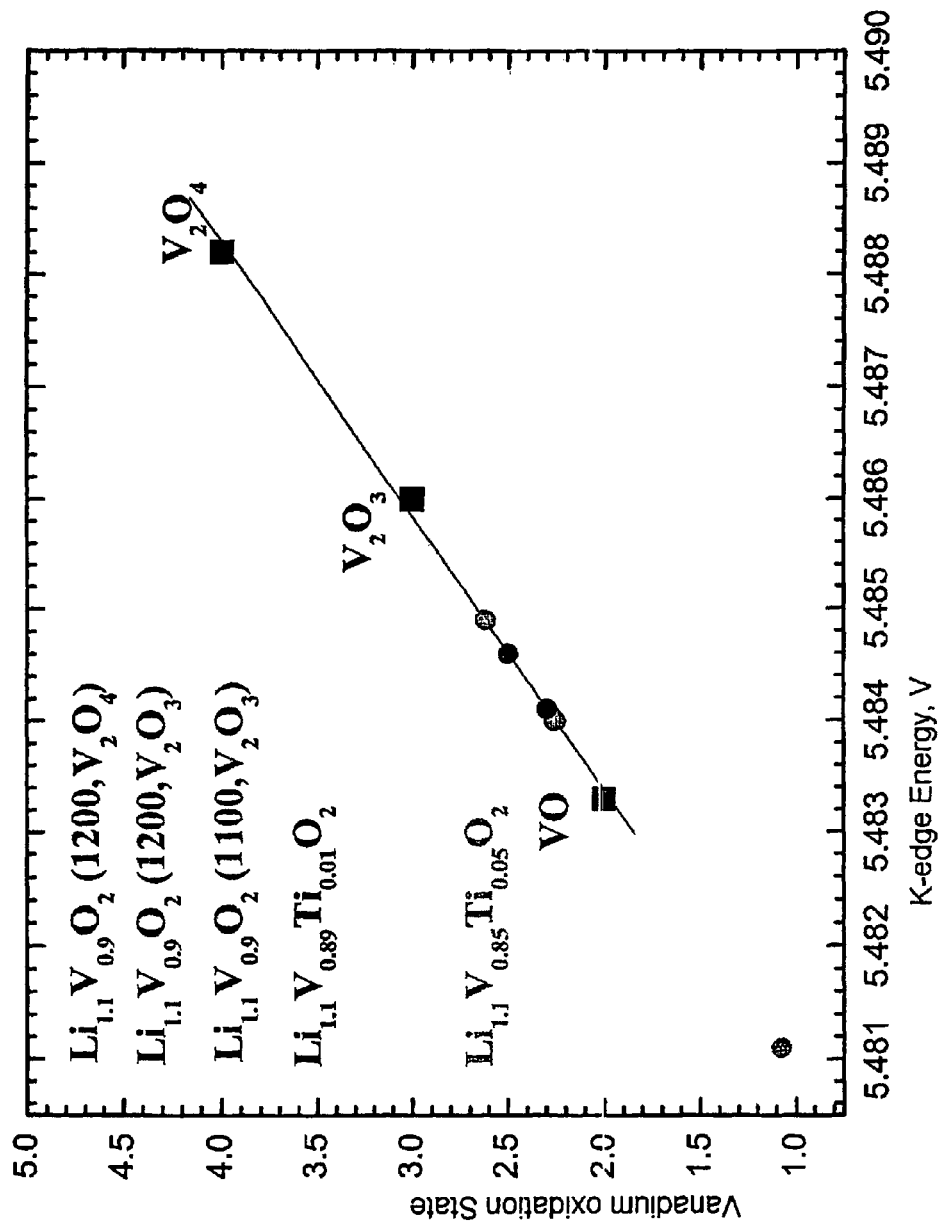
FIG. 10 is a graph illustrating vanadium oxidation numbers converted from K-edge energies shown in FIGS. 7 and 8.

To determine the oxidation number of negative active materials according to Examples 4 to 6 according to the addition of Ti, the K-edge energies were measured using XANES. The results are presented in FIG. 8. For reference, the K-edge energy of $V_2O_3$ is also presented in FIG. 8. In addition, the K-edge energy of vanadium oxides, $V_2O_3$, $V_2O_4$, and $V_2O_5$ are shown in FIG. 9. The K-edge energies shown in FIGS. 8 and 9 were converted into vanadium oxidation numbers. The results are presented in FIG. 10 and Table 1. The K-edge energies and vanadium oxidation numbers according to Comparative Examples 1 to 3 are also presented in Table 1. FIG. 10 and Table 1 indicate that the oxidation numbers according to Examples 4 to 6 were 1.0 to 2.5, and the K-edge energies were 1.4 to 4.9 eV.

TABLE 1

| Compound | 1/2 height of K-edge, keV | Energy position of K-edge respective to $V_2O_3$ | V oxidation state |
|---|---|---|---|
| $V_2O_3$ | 5.4860 ± 0.0003 | — | 3 |
| Comparative Example 1 ($Li_{1.1}V_{0.9}O_2$, from $V_2O_4$) | 5.4840 ± 0.0003 | 2.0 eV | 2.3 |
| Comparative Example 2 ($Li_{1.1}V_{0.9}O_2$, from $V_2O_4$, 1200° C.) | 5.4841 ± 0.0003 | 1.9 eV | 2.3 |
| Comparative Example 3 ($Li_{1.1}V_{0.9}O_2$, from $V_2O_4$, 1100° C.) | 5.4849 ± 0.0003 | 1.1 eV | 2.6 |
| Example 4 ($Li_{1.1}V_{0.89}Ti_{0.01}O_2$, from $V_2O_4$, 1100° C.) | 5.4846 ± 0.0004 | 1.4 eV | 2.5 |
| Example 5 ($Li_{1.1}V_{0.87}Ti_{0.03}O_2$, from $V_2O_4$, 1100° C.) | 5.4829 ± 0.0003 | 3.1 eV | 1.8 |
| Example 6 ($Li_{1.1}V_{0.85}Ti_{0.05}O_2$, from $V_2O_4$, 1100° C.) | 5.4811 ± 0.0003 | 4.9 eV | 1.0 |

Example 10

$V_2O_3$, $LiCO_3$, and $WO_3$ were mixed at the mole ratio of Li:V:W of 1.08:0.85:0.05 without solvent. The mixture was heat-treated at 1000° C. under a nitrogen atmosphere to prepare a $Li_{1.08}V_{0.85}W_{0.05}O_2$ negative active material. Using the negative active material, a negative electrode was produced by the same procedure as in Example 1.

The charge and discharge characteristics of the negative electrode indicated a high initial reversible capacity of 700 mAh/cc and an effective cycle life characteristic, which correspond to the results according to Example 1.

Example 11

$V_2O_3$, $LiCO_3$, and $MoO_3$ were mixed at the mole ratio of Li:V:Mo of 1.08:0.85:0.05 without solvent. The mixture was heat-treated at 1100° C. under a nitrogen atmosphere to prepare a $Li_{1.08}V_{0.85}Mo_{0.05}O_2$ negative active material. Using the negative active material, a negative electrode was produced by the same procedure as in Example 1.

The charge and discharge characteristics of the negative electrode indicated a high initial reversible capacity of 900 mAh/cc (~300 mAh/g) and a good cycle life characteristic.

Example 12

$V_2O_4$, $LiCO_3$, and $MoO_3$ were mixed at the mole ratio of Li:V:Mo of 1.08:0.9:0.02 without solvent. The mixture was heat-treated at 900° C. under a nitrogen atmosphere to prepare a $Li_{1.08}V_{0.9}Mo_{0.02}O_2$ negative active material. The negative active material had a single diffraction pattern of an R-3M crystalline structure. Using the negative active material, a negative electrode was produced by the same procedure as in Example 1.

The charge and discharge characteristics of the negative electrode indicated reversible capacity and cycle life characteristics corresponding to Example 1.

Example 13

$V_2O_5$, $LiCO_3$, and $MoO_3$ were mixed at the mole ratio of Li:V:Mo of 1.08:0.9:0.02 without solvent. The mixture was heat-treated at 1000° C. under a nitrogen atmosphere to prepare a $Li_{1.08}V_{0.9}Mo_{0.02}O_2$ negative active material. Using the negative active material, a negative electrode was produced by the same procedure as in Example 1.

The charge and discharge characteristics of the negative electrode indicated reversible capacity and cycle life characteristics corresponding to Example 1.

Figure 11:
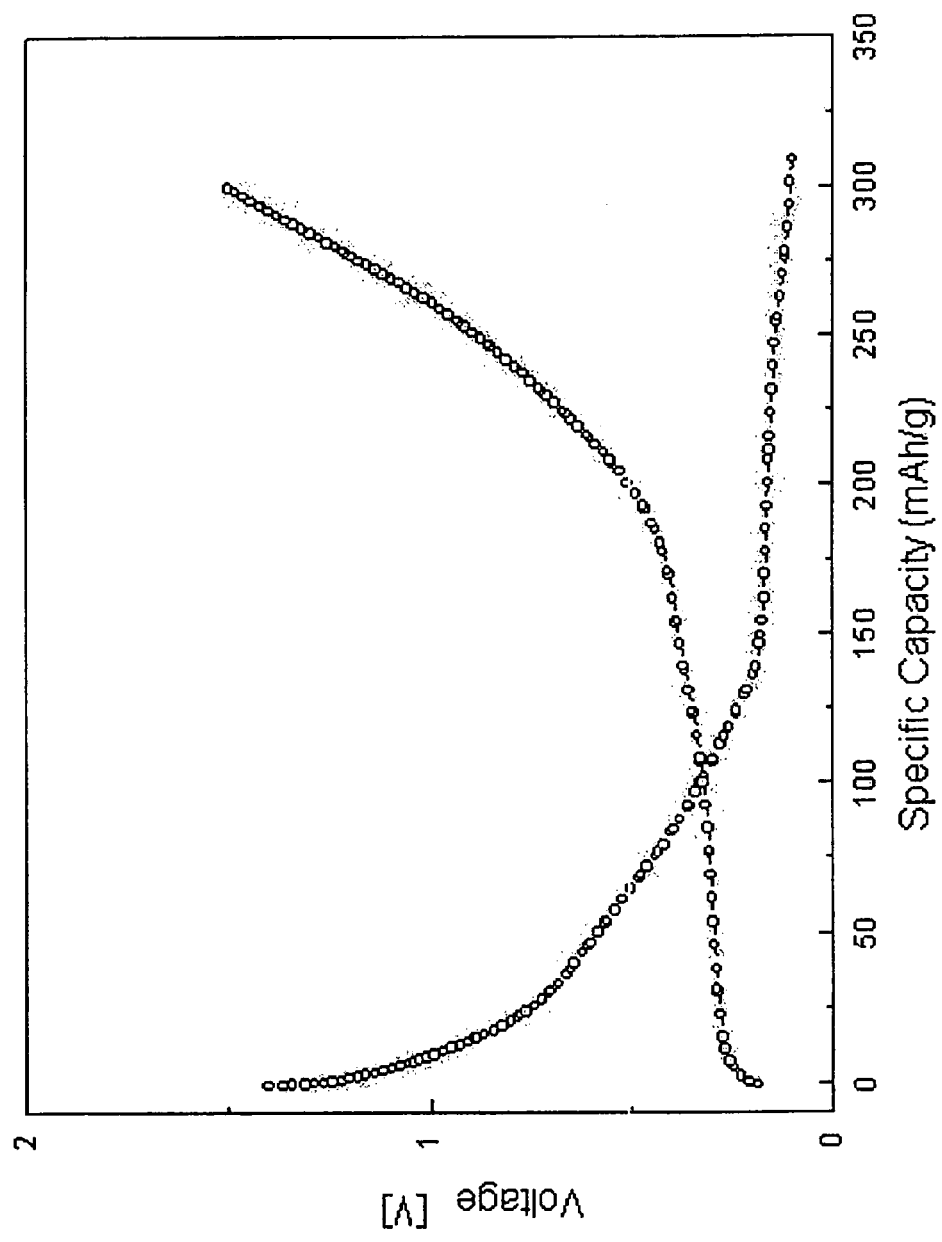
FIG. 11 is a graph illustrating charge and discharge characteristics of the negative active material according to Example 13 of the present invention.
Figure 12:
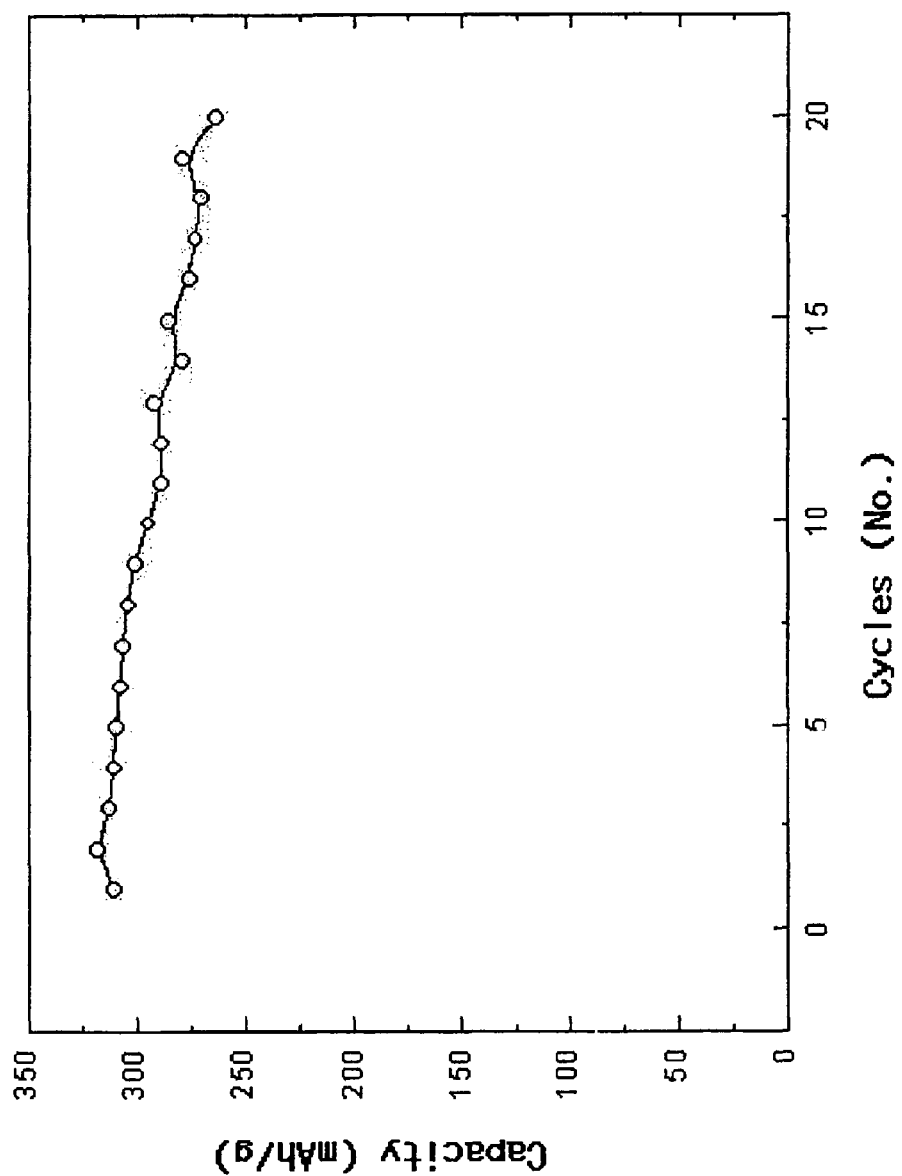
FIG. 12 is a graph showing the cycle life characteristic of the negative active material according to Example 13 of the present invention.

The charge and discharge characteristics of the cell using the negative active material according to Example 13 are shown in FIG. 11, and the cycle life characteristic is shown in FIG. 12. FIGS. 11 and 12 indicate that the cell using the negative active material according to Example 13 exhibited effective charge and discharge and cycle life characteristics.

Example 14

$V_2O_3$, $LiCO_3$, and $TiO_2$ were mixed at the mole ratio of Li:V:Ti of 1.08:0.9:0.02 without solvent. The mixture was heat-treated at 900° C. under a nitrogen atmosphere to prepare a $Li_{1.08}V_{0.9}Ti_{0.02}O_2$ negative active material. The negative active material had a single diffraction pattern of an R-3M crystalline structure.

80 wt % of the negative active material, 10 wt % of a graphite conductive agent, and 10 wt % of a polytetrafluoroethylene binder were mixed in an N-methylpyrrolidone solvent to prepare a negative active material slurry. The slurry was coated on a Cu-foil current collector to produce a negative electrode.

The charge and discharge characteristics of the negative electrode indicated a high initial reversible capacity of 800 mAh/cc and an effective cycle life characteristic.

Example 15

$V_2O_3$, $LiCO_3$, and $TiO_2$ were mixed at the mole ratio of Li:V:Ti of 1.08:0.85:0.05 without solvent. The mixture was heat-treated at 1000° C. under a nitrogen atmosphere to prepare a $Li_{1.08}V_{0.85}Ti_{0.05}O_2$ negative active material. Using the negative active material, a negative electrode was produced by the same procedure as in Example 1.

A charge and discharge test of the negative electrode indicated a high initial reversible capacity of 700 mAh/cc and an effective cycle life characteristic.

Example 16

$V_2O_3$, $LiCO_3$, and $TiO_2$ were mixed at the mole ratio of Li:V:Ti of 1.08:0.85:0.03 without solvent. The mixture was heat-treated at 1100° C. under a nitrogen atmosphere to prepare a $Li_{1.08}V_{0.85}Ti_{0.03}O_2$ negative active material. Using the negative active material, a negative electrode was produced by the same procedure as in Example 1.

The charge and discharge characteristic of the negative electrode indicated a high initial reversible capacity of 900 mAh/cc (~300 mAh/g) and an effective cycle life characteristic.

Example 17

$V_2O_4$, $LiCO_3$ and $TiO_2$ were mixed at the mole ratio of Li:V:Ti of 1.08:0.9:0.02 without solvent. The mixture was heat-treated at 900° C. under a nitrogen atmosphere to prepare a $Li_{1.08}V_{0.9}Ti_{0.02}O_2$ negative active material. The negative active material had a single diffraction pattern of an R-3M crystalline structure. Using the negative active material, a negative electrode was produced by the same procedure as in Example 1.

The charge and discharge characteristics of the negative electrode indicated reversible capacity and cycle life characteristics corresponding to Example 1.

Example 18

$V_2O_5$, $LiCO_3$, and $TiO_2$ were mixed at the mole ratio of Li:V:Ti of 1.08:0.9:0.02 without solvent. The mixture was heat-treated at 1000° C. under a nitrogen atmosphere to prepare a $Li_{1.08}V_{0.9}Ti_{0.02}O_2$ negative active material. Using the negative active material, a negative electrode was produced by the same procedure as in Example 1.

The charge and discharge characteristics of the negative electrode indicated reversible capacity and cycle life characteristics corresponding to Example 1.

Figure 13:
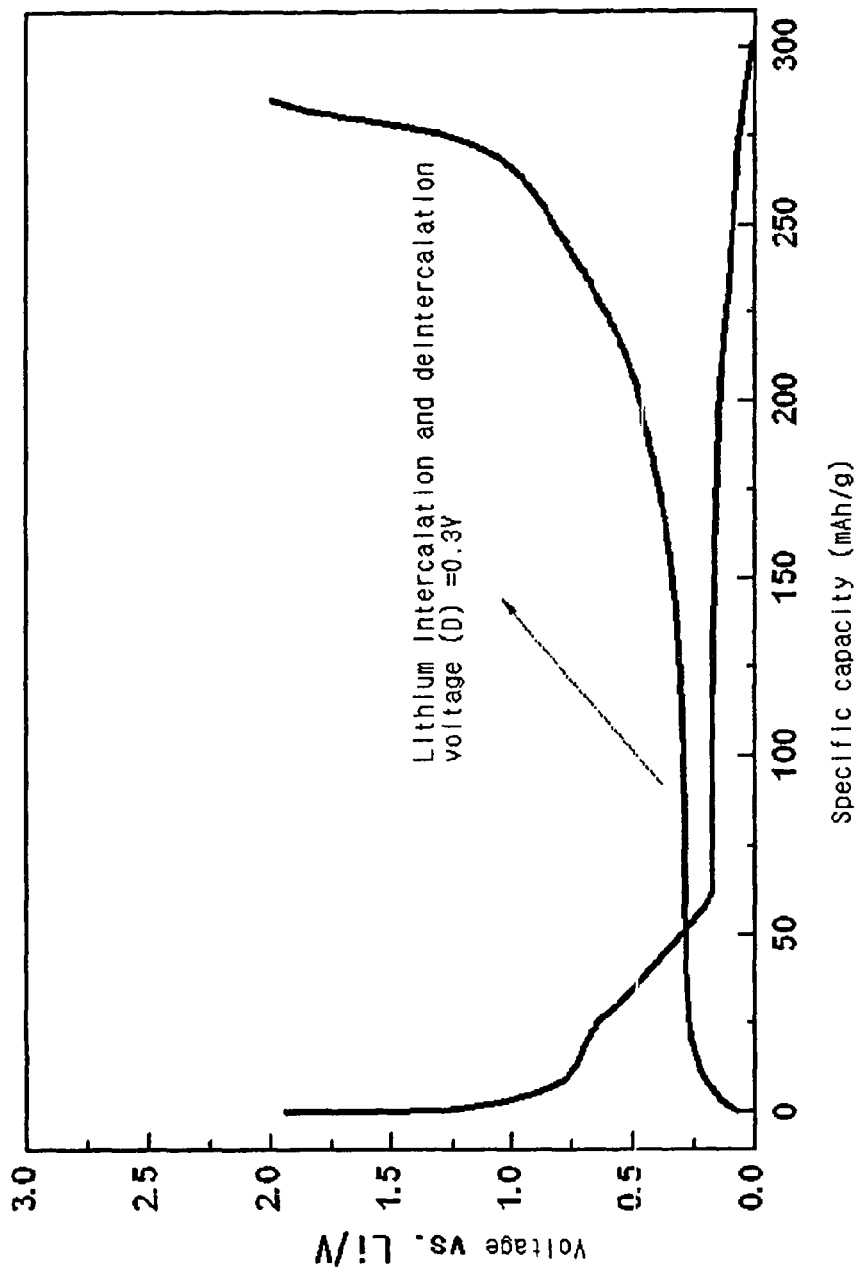
FIG. 13 is a graph showing charge and discharge characteristics of the negative active material according to Example 16 of the present invention.

The charge and discharge characteristics of the cell using the negative active material according to Example 16 are shown in FIG. 13. It is evident from FIG. 13 that the cell using the negative active material according to Example 16 exhibited effective charge and discharge and cycle life characteristics.

Example 19

$V_2O_3$, $Li_2CO_3$, and $MoO_3$ were mixed at the mole ratio of Li:V:Mo of 1.08:0.9:0.02 without solvent. The mixture was heat-treated at 1000□ for 10 hours under a nitrogen atmosphere and then cooled to room temperature. The obtained material was sieved to obtain a $Li_{1.08}V_{0.9}Mo_{0.02}O_2$ negative active material.

Figure 14:
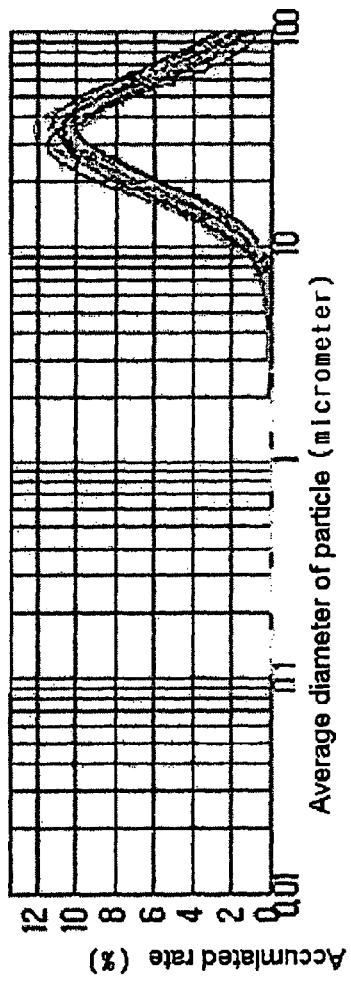
FIG. 14 is a graph showing a particle diameter of the negative active material according to Example 19 of the present invention.

The average diameter of the negative active material according to Example 19 was measured and the result is presented in FIG. 14. As shown in FIG. 14, the average diameter (D50) was about 35 μm.

Example 20

$V_2O_3$, $Li_2CO_3$, and $MoO_3$ were mixed at the mole ratio of Li:V:Mo of 1.08:0.9:0.02 without solvent. The mixture was heat-treated at 1000□ for 10 hours under a nitrogen atmosphere, and then cooled to room temperature. The obtained material was sieved to obtain a $Li_{1.08}V_{0.9}Mo_{0.02}O_2$ negative active material with an average diameter (D50) of 80 μm.

Example 21

$V_2O_4$, $Li_2CO_3$, and $WO_3$ were mixed at the mole ratio of Li:V:W of 1.08:0.85:0.05 without solvent. The mixture was heat-treated at 1000□ for 10 hours under a nitrogen atmosphere, and then cooled to room temperature. The obtained material was sieved to obtain a $Li_{1.08}V_{0.9}Mo_{0.02}O_2$ negative active material with an average diameter (D50) of 25 μm.

Example 22

$V_2O_4$, $Li_2CO_3$, and $WO_3$ were mixed at the mole ratio of Li:V:W of 1.08:0.85:0.05 without solvent. The mixture was heat-treated at 1000□ for 10 hours under a nitrogen atmosphere, and then cooled to room temperature. The obtained material was sieved to obtain a $Li_{1.08}V_{0.9}Mo_{0.02}O_2$ negative active material with an average diameter (D50) of 80 μm.

Example 23

$V_2O_3$, $Li_2CO_3$, and $MoO_3$ were mixed at the mole ratio of Li:V:W of 1:0.95:0.05 without solvent. The mixture was heat-treated at 1000□ for 10 hours under a nitrogen atmosphere and then cooled to room temperature. The obtained material was sieved to obtain a $Li_{1.08}V_{0.9}Mo_{0.02}O_2$ negative active material with an average diameter (D50) of 120 μm.

Comparative Example 4

$V_2O_3$, $Li_2CO_3$, and $MoO_3$ were mixed at the mole ratio of Li:V:W of 3:0.85:0.05 without solvent. The mixture was heat-treated at 1000° C. for 10 hours under a nitrogen atmosphere and then cooled to room temperature. The obtained material was sieved to obtain a $Li_3V_{0.85}Mo_{0.05}O_2$ negative active material with an average diameter (D50) of 30 μm.

Comparative Example 5

$V_2O_3$, $Li_2CO_3$, and $WO_3$ were mixed at the mole ratio of Li:V:W of 1.1:0.05:0.85 without solvent. The mixture was heat-treated at 800° C. for 10 hours under a nitrogen atmosphere and then cooled to room temperature. The obtained material was sieved to obtain a $Li_{1.1}V_{0.05}Mo_{0.85}O_2$ negative active material with an average diameter (D50) of 30 μm.

SEM Photograph

Figure 15:
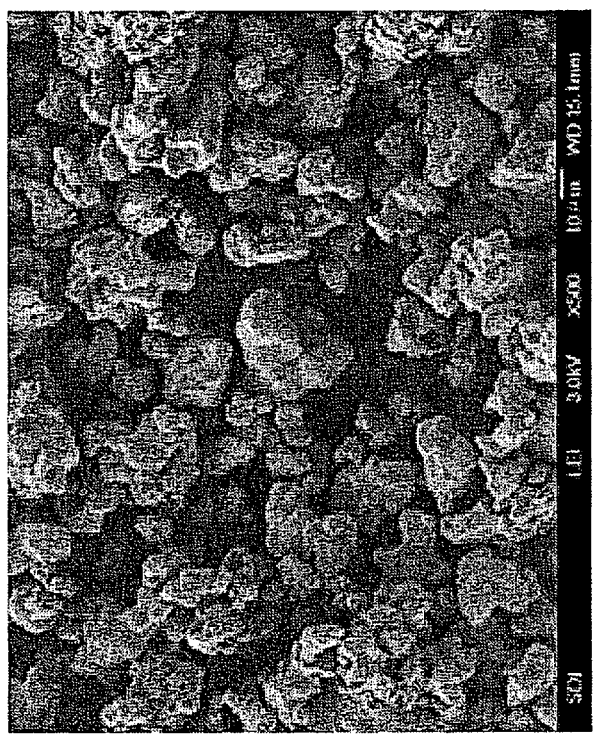
FIG. 15 is a SEM photograph of the negative active material according to Example 19 of the present invention.
Figure 16:
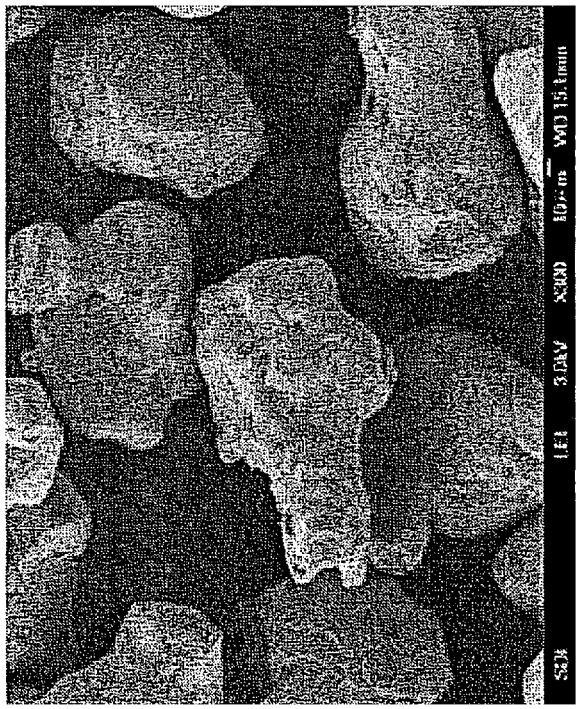
FIG. 16 is a SEM photograph of the negative active material according to Example 20 of the present invention.

The SEM photographs of the negative active materials according to Examples 19 and 20 are shown in FIGS. 15 and 16, respectively. As shown in FIGS. 15 and 16, the negative active materials according to Examples 19 and 20 have an elliptical-like type.

Tapping Density Measurement

Tapping densities of the negative active materials according to Examples 19 and 20 were measured by the following procedure with an MT-1000 (available from SEISHIN CO.), and the results are shown in Table 2.

The negative active material was slowly charged into a 100 ml mass cylinder of which weight was previously measured, with a spoon through a 200 mm mesh until a volume of the negative active material reached 100 ml. A weight of the negative active material charged into the mass cylinder was then obtained by subtraction of the original weight of the mass cylinder (Mo) from the weight of the mass cylinder with the negative active material (M).

Thereafter, the negative active material charged mass cylinder was covered with a rubber plate and was dropped 500 times from a height of 18 mm, and a volume (V) of the packed negative active material was measured.

Using the weight of M and the volume of V, tapping densities were determined by the following mathematical formula 1.

$$D=(M-Mo)/V \qquad \text{Mathematical formula 1}$$

D: Tapping density (g/cc)
Mo: Weight of mass cylinder (g)
M: Weight of mass cylinder with negative active material (g)
V: Volume of negative active material after being dropped 500 times The results are present in Table 2.

Battery Performances Measurements

Electrochemical performance tests (capacity and cycle life) were performed on the negative active materials according to Examples 19 to 23, and Comparative Examples 3 and 4. The negative active material/a graphite conductive agent/a polyvinyldiene fluoride binder were weighed at a weight ratio of 45:45:10, and they were dissolved in an N-methyl-2-pyrrolidone solvent to prepare a slurry. The slurry was coated on a Cu foil to produce a negative electrode in the form of a thin plate (thickness of 40 to 50 μm including the thickness of the Cu foil) and dried in an oven at 135° C. for 3 hours or more followed by pressing. Using the negative electrode and a lithium metal counter electrode, a 2015 coin-type half-cell was fabricated. The cell was charged and discharged at 0.2 C↔0.2 C (one cycle) at 0.01V to 2.0V, 0.2 C↔0.2 C (one cycle) at 0.01V to 1.0V, and 1 C↔1 C (50 cycles) at 0.01V to 1.0V, then the initial capacity, initial discharge capacity per weight, initial discharge capacity per volume, initial efficiency, and cycle-life characteristics (capacity retention) were measured. The results are shown in Table 2. The cycle-life characteristics were percentage values obtained from dividing the discharge capacity after 50 cycles by initial discharge capacity.

TABLE 2

|  | Average diameter (μm) | Tapping density (g/cc) | Density of electrode (g/cc) | Initial charge capacity (mAh/g) | Initial discharge capacity (mAh/g) | Initial discharge capacity (mAh/cc) | Initial efficiency (%) | Cycle-life characteristics (%) |
|---|---|---|---|---|---|---|---|---|
| Example 19 | 35 | 2.2 | 2.4 | 350 | 316 | 758.4 | 90 | 85 |
| Example 20 | 80 | 2 | 2.2 | 362 | 322 | 708.4 | 89 | 83 |
| Example 21 | 25 | 2.1 | 2.6 | 377 | 338 | 878.8 | 90 | 79 |
| Example 22 | 80 | 2 | 2.3 | 364 | 325 | 747.5 | 89 | 80 |
| Example 23 | 120 | 1.1 | 1.5 | 318 | 250 | 375 | 79 | 68 |
| Comparative Example 3 | 30 | 1.5 | 1.9 | 362 | 204 | 387.6 | 56 | — |
| Comparative Example 4 | 30 | 1.8 | 1.7 | 401 | 183 | 311.1 | 46 | — |

As shown in Table 2, the negative active materials according to Examples 19 to 22 have tapping densities of 23 to 2.2 g/cc, an average diameter of 25 to 80 μm, and higher density of the electrode. In addition, the cells with the negative active material according to Examples 19 to 22 exhibited better initial charge capacity per weight, discharge capacity, discharge capacity per volume, and initial efficiency than Comparative Examples 3 and 4. Example 23 using the negative active material having a larger diameter than other materials according to Examples 19 to 22 exhibits a slightly reduced charge and discharge capacity, but a desirable initial efficiency and cycle life characteristics.

The cells according to Comparative Examples 2 and 3 have a similar average diameter and charged density with those according to Examples 1 to 4, but the inherent physical properties of the active materials according to Comparative Examples 2 and 3 deteriorates the charge and discharge efficiency and cycle life characteristics Example 24

$V_2O_3$, $Li_2CO_3$, and $MoO_3$ were mixed at the mole ratio of Li:V:Mo of 1.08:0.9:0.02 without solvent. The mixture was heat-treated at 900° C. for 10 hours under a nitrogen atmosphere and then cooled to room temperature to prepare a $Li_{1.08}V_{0.9}Mo_{0.02}O_2$ negative active material.

Example 25

$V_2O_3$, $Li_2CO_3$, and $WO_3$ were mixed at the mole ratio of Li:V:W of 1.12:0.85:0.05 without solvent. The mixture was heat-treated at 1000° C. for 10 hours under a nitrogen atmosphere, and then cooled to room temperature to prepare a $Li_{1.12}V_{0.85}Mo_{0.05}O_2$ negative active material.

Example 26

$V_2O_3$, $Li_2CO_3$, and $MoO_3$ were mixed at the mole ratio of Li:V:Mo of 1.1:0.85:0.05 without solvent. The mixture was heat-treated at 1100° C. for 10 hours under a nitrogen atmosphere, and then cooled to room temperature to prepare a $Li_{1.1}V_{0.85}Mo_{0.05}O_2$ negative active material.

Example 27

$V_2O_3$, $Li_2CO_3$, and $MoO_3$ were mixed at the mole ratio of Li:V:Mo of 1.08:0.9:0.02 without solvent. The mixture was heat-treated at 900° C. for 10 hours under a nitrogen atmosphere, and then cooled to room temperature to prepare a $Li_{1.08}V_{0.9}Mo_{0.02}O_2$ negative active material.

Comparative Example 6

$V_2O_3$, $Li_2CO_3$ and $MoO_3$ were mixed at the mole ratio of Li:V:Mo of 1:0.95:0.05 without solvent. The mixture was heat-treated at 400° C. for 10 hours under a nitrogen atmosphere, and then cooled to room temperature to prepare a $Li_1V_{0.95}Mo_{0.05}O_2$ negative active material.

Comparative Example 7

$V_2O_3$, $Li_2CO_3$ and $MoO_3$ were mixed at the mole ratio of Li:V:Mo of 3:0.85:0.05 without solvent. The mixture was heat-treated at 1000° C. for 10 hours under a nitrogen atmosphere, and then cooled to room temperature to prepare a $Li_3V_{0.85}Mo_{0.05}O_2$ negative active material.

Comparative Example 8

$V_2O_3$, $Li_2CO_3$ and $MoO_3$ were mixed at the mole ratio of Li:V:Mo of 1.1:0.05:0.85 without solvent. The mixture was heat-treated at 400° C. for 10 hours under a nitrogen atmosphere, and then cooled to room temperature to prepare a $Li_{1.1}V_{0.05}Mo_{0.85}O_2$ negative active material.

Void Volume

Figure 17:
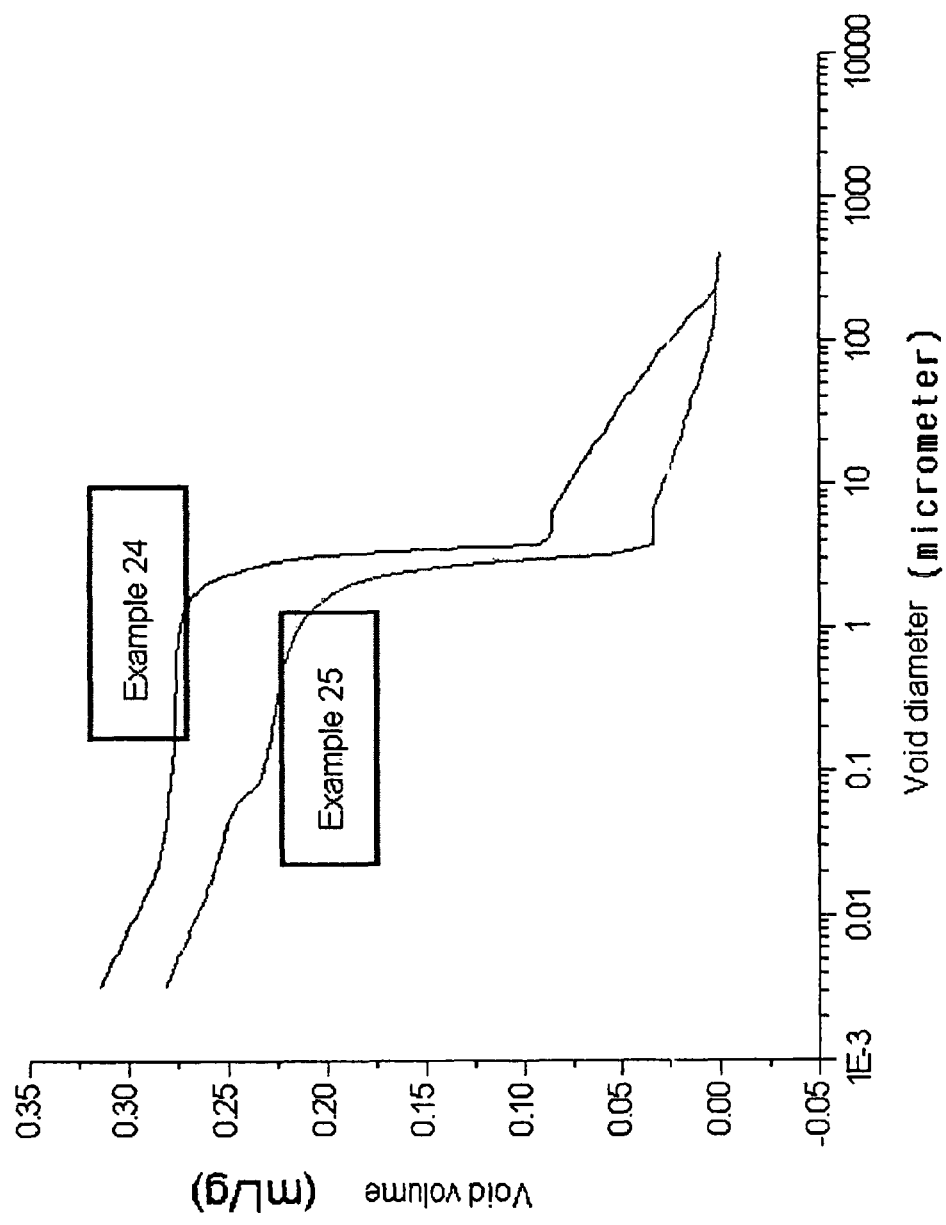
FIG. 17 is void volumes of the negative active materials according to Examples 24 to 25 of the present invention.

The void volumes of the negative active materials according to Examples 24 to 25 were measured and the results are shown in FIG. 17. As shown in FIG. 17, the negative active materials according to Examples 24 to 25 have the void volume of $1\times10^{-3}$ cc/g to 0.33 cc/g per weight of the particle having a size of 0.1 to 10 μm.

Battery Performances Measurements

Electrochemical performance tests (capacity and cycle life) were performed on the negative active materials according to Examples 24 to 27, and Comparative Examples 6 to 8. The negative active material/a graphite conductive agent/a polyvinylidene fluoride binder were weighed at a weight ratio of 45:45:10, and they were dissolved in an N-methyl-2-pyrrolidone solvent to prepare a slurry. The slurry was coated on a Cu foil to produce a negative electrode in the form of a thin plate (thickness of 40 to 50 μm including the thickness of a Cu foil) and dried in an oven at 135° C. for 3 hours or more followed by pressing. Using the negative electrode and a lithium metal counter electrode, a 2015 coin-type half-cell was fabricated. The cell was charged and discharged at 0.2 C↔0.2 C (one cycle) at 0.01V to 2.0V, 0.2 C↔0.2 C (one cycle) at 0.01 V to 1.0V, and 1 C↔1 C (50 cycles) at 0.01 V to 1.0 V, then the initial capacity, initial discharge capacity per weight, initial discharge capacity per volume, initial efficiency and the cycle-life characteristics (capacity retention) were measured. The results are shown in Table 3. The cycle-life characteristics were percentage values obtained from dividing the discharge capacity after 50 cycles by initial discharge capacity. In Table 3, the void volume is an average value of the void volume for a particle with a size of 0.1 to 10 µm.

It is shown from Table 4 that the negative active materials according to Examples 24 to 27 exhibited a full width at half-maximum at a (003) of 0.16 to 0.169, that at a (104) plane of 0.219 to 0.24, and intensity ratio of 0.801 to 1.16. In addition, the negative active materials according to Examples 24 to 27 exhibited lattice constant of a-axis of 2.8556 Å to 2.8697 Å, and lattice constants of c-axis of 14.695 Å to 14.711 Å. Whereas, the negative active materials according to Comparative Examples 5 to 7 exhibited a full width at half-maximum at a (003) plane of 0.398 to 0.515, that at a (104) plane of 0.51 to 0.508, and an intensity ratio of 0.05 to 1.021.

TABLE 3

|  | Void volume (cc/g) (0.1-10 µm) | BET ($m^2$/g) | Initial charge capacity (mAh/g) | Initial discharge capacity (mAh/g) | Initial efficiency (%) | Cycle life (%) |
| --- | --- | --- | --- | --- | --- | --- |
| Example 24 | 0.2 | 3 | 355 | 318 | 90 | 86 |
| Example 25 | 0.2 | 4 | 369 | 320 | 87 | 87 |
| Example 26 | 0.3 | 2.1 | 371 | 338 | 91 | 78 |
| Example 27 | 0.32 | 3.6 | 362 | 327 | 90 | 82 |
| Comparative Example 6 | 11 | 12 | 302 | 236 | 78 | 63 |
| Comparative Example 7 | 13 | 15 | 359 | 259 | 72 | 58 |
| Comparative Example 8 | 12 | 13 | 405 | 196 | 48 | 39 |

X-Ray Diffraction

As shown in Table 3, the cells using negative active materials according to Examples 24 to 27 exhibited corresponding initial charge capacity and initial discharge capacity those according to Comparative Examples 5 to 7, but had higher initial efficiency and cycle life characteristics.

X-Ray Diffraction

Figure 18:
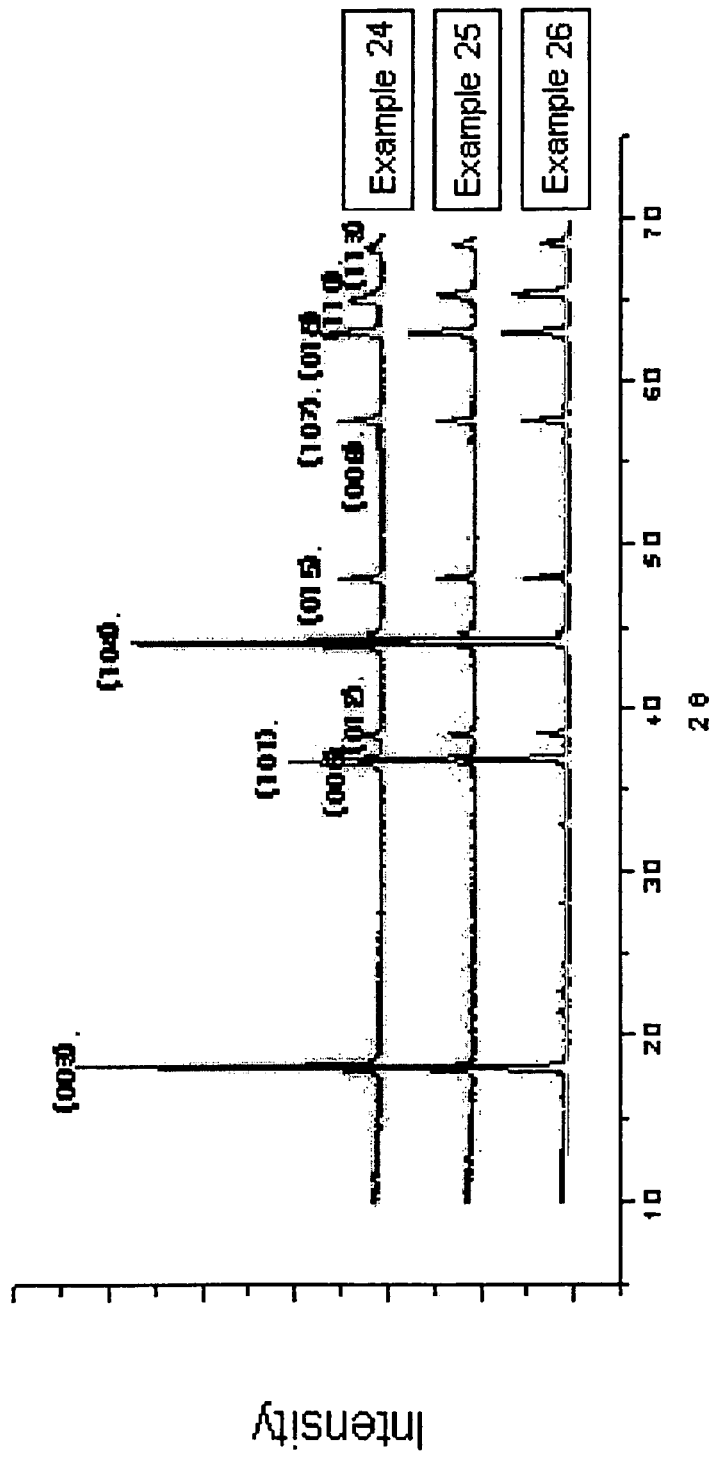
FIG. 18 is a graph showing an X-ray diffraction pattern of the negative active material according to Examples 24 to 26 of the present invention.

The structures of the negative active materials according to Examples 24 to 26 were measured by a powdery method at a rotating speed of 0.02°/1 second with an X-ray irradiation. The results are shown in FIG. 18. It is evident from FIG. 18 that the negative active materials all have similar X-ray diffraction patterns.

The lattice constant, a full width at half-maximum at a (003) and a (104) plane, and the intensity ratio of I(003)/(104) were measured on the negative active materials according to Examples 24 to 27, and Comparative Examples 5 to 7. The results are shown in Table 4.

The vanadium-based oxide negative active material of the present invention provides a higher energy density per unit volume and improves safety such as with respect to fires or explosion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A negative active material of a non-aqueous electrolyte battery, the negative active material comprising a compound represented by formula 1:

$$Li_xM_yV_zO_{2+d} \quad (1)$$

where $0.1 \leq x \leq 2.5$, $0.01 < y \leq 0.05$, $0 \leq d \leq 0.5$, and

TABLE 4

|  | Lattice constant | | (003) | | (104) | | Intensity ratio |
| --- | --- | --- | --- | --- | --- | --- | --- |
|  | a(Å) | c(Å) | 2θ | Full width at half maximum | 2θ | Full width at half maximum | I(003)/I(104) |
| Example 24 | 2.8556 | 14.695 | 18.11 | 0.169 | 44.12 | 0.228 | 0.801 |
| Example 25 | 2.8583 | 14.688 | 18.11 | 0.159 | 44.08 | 0.24 | 0.959 |
| Example 26 | 2.8631 | 14.703 | 18.09 | 0.16 | 44.1 | 0.22 | 1.052 |
| Example 27 | 2.8697 | 14.711 | 18.1 | 0.169 | 44.15 | 0.219 | 1.16 |
| Comparative Example 5 | — | — | 18.708 | 0.515 | 44.12 | 0.508 | 1.021 |
| Comparative Example 6 | — | — | 18.71 | 0.427 | 44.09 | 0.51 | 0.05 |
| Comparative Example 7 | — | — | 18.71 | 0.398 | 44.1 | 0.525 | 0.1 |

M is at least one element selected from the group consisting of Al, Cr, Mo, Ti, W, and Zr, wherein the negative active material has a distance ratio between axes of approximately 2.5 to 6.5, before lithium intercalation, and when the negative active material is intercalated, the negative active material has a distance ratio between axes of approximately 3.5 to 7.0, after lithium intercalation, wherein the negative active material has a void volume ranging from $10^{-3}$ cc/g to 0.8 cc/g for a particle size of 0.1 to 10 gm; and wherein z=0.9−y.

2. The negative active material of claim 1, wherein the negative active material has a distance ratio between axes of approximately 3.0 to 6.2 before lithium intercalation, and, when the negative active material is intercalated, the negative active material has a distance ratio between axes of approximately 4.0 to 7.0 after lithium intercalation.

3. The negative active material of claim 1, wherein the negative active material is intercalated/deintercalated, and the negative active material has a change in crystal lattice volume less than or equal to 30% due to lithium intercalation and deintercalation.

4. The negative active material of claim 3, wherein the negative active material is intercalated/deintercalated, and the negative active material has a change in crystal lattice volume less than or equal to 27% due to lithium intercalation and deintercalation.

5. The negative active material of claim 1, wherein the negative active material has an average oxidation state of vanadium of +1 to +4.

6. The negative active material of claim 1, wherein the negative active material has a tapping density of 1 to 5 g/cc.

7. The negative active material of claim 6, wherein the negative active material has a tapping density of 1.2 to 4.5 g/cc.

8. The negative active material of claim 1, wherein the negative active material has an average diameter of 1 to 100 μm.

9. The negative active material of claim 8, wherein the negative active material has an average diameter of 5 to 80 μm.

10. The negative active material of claim 1, wherein the negative active material has a void volume ranging from 0.01 cc/g to 0.3 cc/g for a particle size of 0.1 to 10 μm.

11. The negative active material of claim 10, wherein the negative active material has a void volume ranging 0.1 cc/g to 0.8 cc/g for a particle size of 0.1 to 10 μm.

12. The negative active material of claim 1, wherein the negative active material has a specific surface area of 0.01 to 10 m²/g.

13. The negative active material of claim 12, wherein the negative active material has a specific surface area of 0.01 to 5 m²/g.

14. The negative active material of claim 13, wherein the negative active material has a specific surface area of 0.1 to 5 m²/g.

15. The negative active material of claim 1, wherein the negative active material has a full width at half maximum of an X-ray diffraction peak at a (003) plane of 0.5 or less, and a full width at half maximum of an X-ray diffraction peak at a (104) plane of 0.5 or less.

16. The negative active material of claim 1, wherein the negative active material has a full width at half maximum of an X-ray diffraction peak at a (003) plane of 0.3 or less, and a full width at half maximum of an X-ray diffraction peak at a (104) plane of 0.4 or less.

17. The negative active material of claim 1, wherein the negative active material has, an X-ray diffraction intensity ratio l(003)/l(104) of an X-ray diffraction peak intensity at a (003) plane to an X-ray diffraction peak intensity at a (104) plane of 0.3 to 2.

18. The negative active material of claim 17, wherein the negative active material has an X-ray diffraction intensity ratio l(003)/l(104) of an X-ray diffraction peak intensity at a (003) plane to an X-ray diffraction peak intensity at a (104) plane of 0.5 to 1.5.

19. The negative active material of claim 1, wherein the positive active material has a 2.8 Å<lattice constant of a-axis<2.9 Å and 14 Å<lattice constant of c-axis<15 Å.

20. A non-aqueous electrolyte battery comprising:
a positive electrode comprising a positive active material to intercalate/deintercalate lithium;
a non-aqueous electrolyte; and
a negative electrode comprising a negative active material including a compound represented by formula 1:

$$Li_xM_yV_zO_{2+d} \qquad (1)$$

where $0.1 \leq x \leq 2.5$, $0.01 < y \leq 0.05$, $0 \leq d \leq 0.5$, and

M is at least one element selected from the group consisting of Al, Cr, Mo, Ti, W, and Zr, wherein the negative active material has a distance ratio between axes of approximately 2.5 to 6.5 before lithium intercalation, the negative active material is intercalated/deintercalated, and the negative active material has a distance ratio between axes of approximately 3.5 to 7 after lithium intercalation, wherein the negative active material has a void volume ranging $10^{-3}$ cc/g to 0.8 cc/g for a particle size of 0.1 to 10 μm; and wherein z=0.9−y.

21. The non-aqueous electrolyte battery of claim 20, wherein the negative active material has a distance ratio between axes of approximately 3.0 to 6.2 before lithium intercalation, the negative active material is intercalated/deintercalated, and the negative active material has a distance ratio between axes of approximately 3.5 to 7.0 after lithium intercalation.

22. The non-aqueous electrolyte battery of claim 20, wherein the negative active material has a change in crystal lattice volume less than or equal to 30% due to lithium intercalation and deintercalation.

23. The non-aqueous electrolyte battery of claim 22, wherein the negative active material has a change in crystal lattice volume less than or equal to 27% due to lithium intercalation and deintercalation.

24. The non-aqueous electrolyte battery of claim 20, wherein the negative active material has an average oxidation state of vanadium of +1 to +4.

25. The non-aqueous electrolyte battery of claim 20, wherein the positive active material is at least one selected from compounds represented by formulas 2 to 13:

$$Li_xMn_{1-y}M_yA_2 \qquad (2)$$

$$Li_xMn_{1-y}M_yO_{2-z}X_z \qquad (3)$$

$$Li_xMn_2O_{4-z}X_z \qquad (4)$$

$$Li_xCo_{1-y}M_yA_2 \qquad (5)$$

$$Li_xCo_{1-y}M_yO_{2-z}X_z \qquad (6)$$

$$Li_xNi_{1-y}M_yA_2 \qquad (7)$$

$$Li_xNi_{1-y}M_yO_{2-z}X_z \qquad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}CO_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

where $0.90 \leq x \leq 1.1$; $0 \leq y \leq 0.5$; $0 \leq z \leq 0.5$; $0 \leq \alpha \leq 2$; M is at least one selected from the group consisting of Al, Ni, Co, Mn, Cr, Fe, Mg, Sr, V and rare earth elements; and A is selected from the group consisting of O, F, S and P; and X is F, S or P.

26. The non-aqueous electrolyte battery of claim 20, wherein the non-aqueous electrolyte includes at least one organic solvent.

27. The non-aqueous electrolyte battery of claim 20, wherein the non-aqueous electrolyte includes at least one lithium salt selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)$ (where x are y are natural numbers), LiCl, and LiI.

28. The non-aqueous electrolyte battery of claim 20, wherein the negative active material has a tapping density of 1 to 5 glee.

29. The non-aqueous electrolyte battery of claim 20, wherein the negative active material has a tapping density of 1.2 to 4.5 glee.

30. The non-aqueous electrolyte battery of claim 20, wherein the negative active material has an average diameter of 1 to 100 μM.

31. The non-aqueous electrolyte battery of claim 30, wherein the negative active material has an average diameter of 5 to 80 μm.

32. The non-aqueous electrolyte battery of claim 20, wherein the negative active material has a void volume ranging 0.01 cc/g to 0.3 cc/g for a particle size of 0.1 to 10 μm.

33. The non-aqueous electrolyte battery of claim 32, wherein the negative active material has a void volume ranging 0.1 cc/g to 0.8 cc/g for a particle size of 0.1 to 10 μm.

34. The non-aqueous electrolyte battery of claim 20, wherein the negative active material has a specific area of 0.01 to 10 $m^2/g$.

35. The non-aqueous electrolyte battery of claim 34, wherein the negative active material has a specific surface area of 0.01 to 5 $m^2/g$.

36. The non-aqueous electrolyte battery of claim 20, wherein the negative active material has a specific surface area of 0.1 to 5 $m^2/g$.

37. The non-aqueous electrolyte battery of claim 20, wherein the negative active material has a full width at half maximum of an X-ray diffraction at a (003) plane of 0.5 or less, and a full width at half maximum of an X-ray diffraction at a (104) plane of 0.5 or less.

38. The non-aqueous electrolyte battery of claim 37, wherein the negative active material has a full width at half maximum of an X-ray diffraction at a (003) plane of 0.3 or less, and a full width at half maximum of an X-ray diffraction at a (104) plane of 0.4 or less.

39. The non-aqueous electrolyte battery of claim 20, wherein the negative active material has an X-ray diffraction intensity ratio l(003)/l(104) of an X-ray diffraction peak intensity at a (003) plane to an X-ray diffraction peak intensity at a (104) plane of 0.3 to 2.

40. The non-aqueous electrolyte battery of claim 39, wherein the negative active material has an X-ray diffraction intensity ratio l(003)/l(104) of an X-ray diffraction peak intensity at a (003) plane to an X-ray diffraction peak intensity at a (104) plane of 0.5 to 1.5.

41. The non-aqueous electrolyte battery of claim 20, wherein the positive active material has a 2.8 Å<lattice constant of a-axis<2.9 Å and 14 Å<lattice constant of c-axis<15 Å.

* * * * *